(12) United States Patent
Hotelling

(10) Patent No.: US 11,275,405 B2
(45) Date of Patent: Mar. 15, 2022

(54) MULTI-FUNCTIONAL HAND-HELD DEVICE

(75) Inventor: Steven P. Hotelling, San Jose, CA (US)

(73) Assignee: Apple Inc., Cupertino, CA (US)

(*) Notice: Subject to any disclaimer, the term of this patent is extended or adjusted under 35 U.S.C. 154(b) by 635 days.

(21) Appl. No.: 11/367,749

(22) Filed: Mar. 3, 2006

(65) Prior Publication Data
US 2006/0197753 A1    Sep. 7, 2006

Related U.S. Application Data

(60) Provisional application No. 60/658,777, filed on Mar. 4, 2005, provisional application No. 60/663,345, filed on Mar. 16, 2005.

(51) Int. Cl.
  *G06F 1/16*     (2006.01)
  *G06F 3/0488*   (2013.01)
  *G06F 3/044*    (2006.01)
  *G06F 3/041*    (2006.01)
  *G06F 3/01*     (2006.01)
  *G06F 3/02*     (2006.01)
  (Continued)

(52) U.S. Cl.
  CPC ............ *G06F 1/1626* (2013.01); *G06F 1/169* (2013.01); *G06F 1/1637* (2013.01); *G06F 3/016* (2013.01); *G06F 3/02* (2013.01); *G06F 3/0412* (2013.01); *G06F 3/0445* (2019.05); *G06F 3/0446* (2019.05); *G06F 3/0482* (2013.01); *G06F 3/0485* (2013.01); *G06F 3/04883* (2013.01); *G06F 3/04886* (2013.01); *G09G 3/36* (2013.01); *G06F 3/04144* (2019.05); *G06F 2203/04106* (2013.01); *G06F 2203/04808* (2013.01)

(58) Field of Classification Search
  CPC ................. G60F 3/044; G60F 3/0414; G60F 2203/04104
  USPC ................. 345/173, 174, 156, 158
  See application file for complete search history.

(56) References Cited

U.S. PATENT DOCUMENTS 3,333,160 A    7/1967  Gorski
3,541,541 A   11/1970  Englebart
(Continued)

FOREIGN PATENT DOCUMENTS

CA    1243096      10/1988    ................. 340/180
CN    1166214 A    11/1997
(Continued)

OTHER PUBLICATIONS

U.S. Appl. No. 10/654,108, filed Sep. 2, 2003 entitled "Ambidextrous Mouse".
(Continued)

*Primary Examiner* — William Boddie
*Assistant Examiner* — Bipin Gyawali
(74) *Attorney, Agent, or Firm* — Kubota & Basol LLP

(57) ABSTRACT

Disclosed herein is a multi-functional hand-held device capable of configuring user inputs based on how the device is to be used. Preferably, the multi-functional hand-held device has at most only a few physical buttons, keys, or switches so that its display size can be substantially increased. The multi-functional hand-held device also incorporates a variety of input mechanisms, including touch sensitive screens, touch sensitive housings, display actuators, audio input, etc. The device also incorporates a user-configurable GUI for each of the multiple functions of the devices.

23 Claims, 16 Drawing Sheets

(51) Int. Cl.
  *G06F 3/0482* (2013.01)
  *G06F 3/0485* (2013.01)
  *G09G 3/36* (2006.01)
  *G06F 3/04883* (2022.01)
  *G06F 3/04886* (2022.01)

(56) References Cited

U.S. PATENT DOCUMENTS

| | | | |
|---|---|---|---|
| 3,662,105 A | 5/1972 | Hurst et al. | 178/18 |
| 3,798,370 A | 3/1974 | Hurst | 178/18 |
| 4,110,749 A | 8/1978 | Janko et al. | |
| 4,246,452 A | 1/1981 | Chandler | 200/5 |
| 4,264,903 A | 4/1981 | Bigelow | |
| 4,550,221 A | 10/1985 | Mabusth | 178/18 |
| 4,566,001 A | 1/1986 | Moore et al. | |
| 4,672,364 A | 6/1987 | Lucas | 340/365 P |
| 4,672,558 A | 6/1987 | Beckes et al. | 364/518 |
| 4,689,761 A | 8/1987 | Yurchenco | |
| 4,692,809 A | 9/1987 | Beining et al. | 358/247 |
| 4,695,827 A | 9/1987 | Beining et al. | 340/365 P |
| 4,719,524 A | 1/1988 | Morishima et al. | |
| 4,733,222 A | 3/1988 | Evans | 340/365 C |
| 4,734,685 A | 3/1988 | Watanabe | 340/710 |
| 4,736,191 A | 4/1988 | Matzke et al. | |
| 4,746,770 A | 5/1988 | McAvinney | 178/18 |
| 4,771,276 A | 9/1988 | Parks | 340/712 |
| 4,788,384 A | 11/1988 | Bruere-Dawson et al. | 178/18 |
| 4,806,846 A | 2/1989 | Kerber | 324/60 CD |
| 4,857,916 A | 8/1989 | Bellin | |
| 4,866,602 A | 9/1989 | Hall | |
| 4,891,508 A | 1/1990 | Campbell | |
| 4,896,370 A | 1/1990 | Kasparian et al. | |
| 4,898,555 A | 2/1990 | Sampson | 445/22 |
| 4,917,516 A | 4/1990 | Retter | |
| 4,922,236 A | 5/1990 | Heady | |
| 4,933,660 A * | 6/1990 | Wynne, Jr. | 338/114 |
| 4,968,877 A | 11/1990 | McAvinney et al. | 250/221 |
| 4,970,819 A | 11/1990 | Mayhak | |
| 5,003,519 A | 3/1991 | Noirjean | 368/73 |
| 5,017,030 A | 5/1991 | Crews | 400/485 |
| 5,027,690 A | 7/1991 | Wachi et al. | |
| 5,125,077 A | 6/1992 | Hall | |
| 5,178,477 A | 1/1993 | Gambaro | 400/489 |
| 5,179,648 A | 1/1993 | Hauck | |
| 5,186,646 A | 2/1993 | Pederson | |
| 5,189,403 A | 2/1993 | Franz et al. | 340/711 |
| 5,194,862 A | 3/1993 | Edwards | 341/20 |
| 5,224,151 A | 6/1993 | Bowen et al. | |
| 5,224,861 A | 7/1993 | Glass et al. | 434/35 |
| 5,225,959 A | 7/1993 | Stearns | |
| 5,237,311 A | 8/1993 | Mailey et al. | |
| 5,241,308 A | 8/1993 | Young | 341/34 |
| 5,252,951 A | 10/1993 | Tannenbaum et al. | 345/156 |
| 5,281,966 A | 1/1994 | Walsh | 341/22 |
| 5,305,017 A | 4/1994 | Gerpheide | 345/174 |
| D349,280 S | 8/1994 | Kaneko | |
| 5,339,213 A | 8/1994 | O'Callaghan | |
| 5,345,543 A | 9/1994 | Capps et al. | 395/137 |
| 5,355,148 A | 10/1994 | Anderson | |
| 5,376,948 A | 12/1994 | Roberts | 345/173 |
| 5,379,057 A | 1/1995 | Clough et al. | |
| 5,398,310 A | 3/1995 | Tchao et al. | 395/144 |
| 5,404,152 A | 4/1995 | Nagai | |
| 5,404,458 A * | 4/1995 | Zetts | G06F 3/04883 710/73 |
| 5,414,445 A | 5/1995 | Kaneko et al. | |
| 5,438,331 A | 8/1995 | Gilligan et al. | |
| 5,442,742 A | 8/1995 | Greyson et al. | 395/146 |
| D362,431 S | 9/1995 | Kaneko et al. | |
| 5,463,388 A | 10/1995 | Boie et al. | 341/33 |
| 5,463,696 A | 10/1995 | Beernink et al. | 382/186 |
| 5,473,343 A | 12/1995 | Kimmich et al. | |
| 5,473,344 A | 12/1995 | Bacon et al. | |
| 5,483,261 A * | 1/1996 | Yasutake | 345/173 |
| 5,488,204 A | 1/1996 | Mead et al. | 178/18 |
| 5,491,706 A | 2/1996 | Tagawa et al. | |
| 5,495,077 A | 2/1996 | Miller et al. | 178/18 |
| 5,495,566 A | 2/1996 | Kwatinetz | |
| 5,510,813 A | 4/1996 | Makinwa et al. | |
| 5,513,309 A | 4/1996 | Meier et al. | 395/155 |
| 5,523,775 A | 6/1996 | Capps | 345/179 |
| 5,528,265 A | 6/1996 | Harrison | |
| 5,530,455 A | 6/1996 | Gillick et al. | 345/163 |
| 5,541,372 A | 7/1996 | Baller et al. | |
| 5,543,590 A | 8/1996 | Gillespie et al. | 178/18 |
| 5,543,591 A | 8/1996 | Gillespie et al. | 178/18 |
| 5,559,943 A | 9/1996 | Cyr et al. | |
| 5,561,445 A | 10/1996 | Michio et al. | |
| 5,563,632 A | 10/1996 | Roberts | 345/173 |
| 5,563,996 A | 10/1996 | Tchao | 395/144 |
| 5,565,658 A | 10/1996 | Gerpheide et al. | 178/19 |
| 5,565,887 A | 10/1996 | McCambridge et al. | |
| 5,578,817 A | 11/1996 | Bidiville et al. | |
| 5,579,036 A | 11/1996 | Yates, IV | 345/173 |
| 5,581,681 A | 12/1996 | Tchao et al. | 395/804 |
| 5,583,946 A | 12/1996 | Gourdol | 382/187 |
| 5,585,823 A | 12/1996 | Duchon et al. | |
| 5,589,856 A | 12/1996 | Stein et al. | |
| 5,590,219 A | 12/1996 | Gourdol | 382/202 |
| 5,592,198 A * | 1/1997 | Fagard | G01C 23/00 345/1.1 |
| 5,592,566 A | 1/1997 | Pagallo et al. | 382/187 |
| 5,594,471 A * | 1/1997 | Deeran et al. | 345/173 |
| 5,594,810 A | 1/1997 | Gourdol | 382/187 |
| 5,596,347 A | 1/1997 | Robertson et al. | |
| 5,596,694 A | 1/1997 | Capps | 395/152 |
| 5,598,183 A | 1/1997 | Robertson et al. | |
| 5,598,527 A | 1/1997 | Debrus et al. | |
| 5,611,040 A | 3/1997 | Brewer et al. | |
| 5,611,060 A | 3/1997 | Belfiore et al. | |
| 5,612,719 A | 3/1997 | Beernink et al. | 345/173 |
| 5,631,805 A | 5/1997 | Bonsall | 361/681 |
| 5,633,955 A | 5/1997 | Bozinovic et al. | 381/187 |
| 5,634,102 A | 5/1997 | Capps | 395/334 |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | 382/229 |
| D382,550 S | 8/1997 | Kaneko et al. | |
| 5,661,505 A | 8/1997 | Livits | |
| 5,663,070 A | 9/1997 | Barr et al. | |
| 5,666,113 A | 9/1997 | Logan | 341/34 |
| 5,666,502 A | 9/1997 | Capps | 345/352 |
| 5,666,552 A | 9/1997 | Grayson et al. | 395/802 |
| D385,542 S | 10/1997 | Kaneko et al. | |
| 5,675,361 A | 10/1997 | Santilli | 345/168 |
| 5,675,362 A | 10/1997 | Clough et al. | |
| 5,677,710 A | 10/1997 | Thompson-Rohrlich | 345/173 |
| 5,686,720 A | 11/1997 | Tullis | |
| 5,689,253 A | 11/1997 | Hargreaves et al. | 341/22 |
| 5,710,844 A | 1/1998 | Capps et al. | 382/317 |
| 5,726,687 A | 3/1998 | Belfiore et al. | |
| 5,729,219 A | 3/1998 | Armstrong et al. | |
| 5,729,250 A | 3/1998 | Bishop et al. | 345/175 |
| 5,730,165 A | 3/1998 | Philipp | 137/1 |
| 5,736,976 A | 4/1998 | Cheung | 345/168 |
| 5,741,990 A | 4/1998 | Davies | 84/423 R |
| 5,745,116 A | 4/1998 | Pisutha-Arnond | 345/358 |
| 5,745,591 A | 4/1998 | Feldman | |
| 5,745,716 A | 4/1998 | Tchao et al. | 395/350 |
| 5,746,818 A | 5/1998 | Yatake | 106/31.86 |
| 5,748,185 A | 5/1998 | Stephan et al. | |
| 5,748,269 A | 5/1998 | Harris et al. | 349/58 |
| 5,751,274 A | 5/1998 | Davis | |
| 5,754,890 A | 5/1998 | Holmdahl et al. | |
| 5,757,457 A | 6/1998 | Gerpheide et al. | |
| 5,764,222 A | 6/1998 | Shieh | 345/173 |
| 5,764,818 A | 6/1998 | Capps et al. | |
| 5,766,493 A | 6/1998 | Shin | |
| 5,767,457 A | 6/1998 | Gerpheide et al. | 178/18 |
| 5,767,842 A | 6/1998 | Korth | 345/168 |
| 5,786,804 A | 7/1998 | Gordon | |
| 5,786,818 A | 7/1998 | Brewer et al. | |
| 5,790,104 A | 8/1998 | Shieh | 345/173 |
| 5,790,107 A | 8/1998 | Kasser et al. | 345/174 |

(56) References Cited

U.S. PATENT DOCUMENTS

| | | | |
|---|---|---|---|
| 5,793,881 A | 8/1998 | Stiver et al. | |
| 5,802,516 A | 9/1998 | Shwarts et al. | 707/6 |
| 5,808,567 A | 9/1998 | McCloud | 341/20 |
| 5,808,602 A | 9/1998 | Sellers | |
| 5,809,267 A | 9/1998 | Moran et al. | 395/358 |
| 5,812,114 A | 9/1998 | Loop | |
| 5,816,225 A | 10/1998 | Koch et al. | |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,351 A | 10/1998 | Tam | 345/173 |
| 5,825,352 A * | 10/1998 | Bisset | G06F 3/044 345/157 |
| 5,825,353 A | 10/1998 | Will | |
| 5,828,364 A | 10/1998 | Siddiqui | |
| 5,835,079 A | 11/1998 | Shieh | |
| 5,838,304 A | 11/1998 | Hall | |
| 5,841,078 A | 11/1998 | Miller et al. | |
| 5,841,425 A | 11/1998 | Zenz, Sr. | |
| 5,841,426 A | 11/1998 | Dodson et al. | |
| D402,281 S | 12/1998 | Ledbetter et al. | |
| 5,844,547 A * | 12/1998 | Minakuchi | G06F 3/04842 345/173 |
| 5,850,213 A | 12/1998 | Imai et al. | |
| 5,854,625 A | 12/1998 | Frisch et al. | 345/173 |
| 5,856,822 A | 1/1999 | Du et al. | |
| 5,880,411 A | 3/1999 | Gillespie et al. | 178/18.01 |
| 5,880,715 A | 3/1999 | Garrett | |
| 5,883,619 A | 3/1999 | Hoe et al. | |
| 5,886,687 A | 3/1999 | Gibson | |
| 5,889,236 A | 3/1999 | Gillespie et al. | |
| 5,898,434 A | 4/1999 | Small et al. | 345/348 |
| 5,900,848 A | 5/1999 | Haneda et al. | |
| 5,903,229 A | 5/1999 | Kishi | |
| 5,907,152 A | 5/1999 | Dändliker et al. | |
| 5,907,318 A | 5/1999 | Medina | |
| 5,909,211 A | 6/1999 | Combs et al. | |
| 5,910,799 A | 6/1999 | Carpenter et al. | |
| 5,914,705 A | 6/1999 | Johnson et al. | |
| 5,914,706 A | 6/1999 | Kono | |
| 5,920,309 A | 7/1999 | Bisset et al. | 345/173 |
| 5,923,319 A | 7/1999 | Bishop et al. | 345/175 |
| 5,931,906 A | 8/1999 | Fidelibus, Jr. et al. | |
| 5,933,134 A | 8/1999 | Shieh | 345/173 |
| 5,943,044 A | 8/1999 | Martinelli et al. | 345/174 |
| 5,956,019 A | 9/1999 | Bang et al. | |
| 5,959,611 A | 9/1999 | Smailagic et al. | |
| 5,977,867 A | 11/1999 | Blouin | |
| 5,977,869 A | 11/1999 | Andreas | |
| 5,977,952 A | 11/1999 | Francis | |
| 5,982,302 A | 11/1999 | Ure | |
| 5,991,431 A | 11/1999 | Borza et al. | |
| 5,996,080 A | 11/1999 | Silva et al. | |
| 5,999,166 A | 12/1999 | Rangan | |
| 6,002,389 A | 12/1999 | Kasser | 345/173 |
| 6,002,808 A | 12/1999 | Freeman | 382/288 |
| 6,005,299 A | 12/1999 | Hengst | |
| 6,020,881 A | 2/2000 | Naughton et al. | 345/327 |
| 6,029,214 A | 2/2000 | Dorfman et al. | |
| 6,031,518 A | 2/2000 | Adams et al. | |
| 6,031,524 A | 2/2000 | Kunert | 345/173 |
| 6,037,882 A | 3/2000 | Levy | 341/20 |
| 6,041,134 A | 3/2000 | Merjanian | |
| 6,049,328 A | 4/2000 | Vanderheiden | |
| 6,050,825 A | 4/2000 | Nichol et al. | 434/227 |
| 6,052,339 A | 4/2000 | Frenkel et al. | 368/230 |
| 6,064,370 A | 5/2000 | Wang et al. | |
| 6,069,648 A | 5/2000 | Suso et al. | |
| 6,072,471 A | 6/2000 | Lo | |
| 6,072,475 A | 6/2000 | Van | |
| 6,072,494 A | 6/2000 | Nguyen | 345/358 |
| 6,075,533 A | 6/2000 | Chang | |
| 6,084,574 A | 7/2000 | Bidiville | |
| 6,084,576 A | 7/2000 | Leu et al. | 345/168 |
| 6,097,372 A | 8/2000 | Suzuki | |
| 6,107,997 A | 8/2000 | Ure | 345/173 |
| 6,111,563 A | 8/2000 | Hines | |
| 6,115,028 A | 9/2000 | Balakrishnan et al. | |
| 6,118,435 A | 9/2000 | Fujita et al. | |
| 6,124,587 A | 9/2000 | Bidiville et al. | |
| 6,125,285 A | 9/2000 | Chavez et al. | |
| 6,128,003 A | 10/2000 | Smith et al. | 345/157 |
| 6,128,006 A | 10/2000 | Rosenberg et al. | |
| 6,130,664 A | 10/2000 | Suzuki | |
| 6,131,047 A | 10/2000 | Hayes, Jr. et al. | |
| 6,131,299 A | 10/2000 | Raab et al. | 33/503 |
| 6,135,958 A | 10/2000 | Mikula-Curtis et al. | 600/443 |
| 6,144,380 A | 11/2000 | Schwarts et al. | 345/350 |
| 6,163,312 A | 12/2000 | Furuya | |
| 6,163,616 A | 12/2000 | Feldman | |
| 6,166,721 A | 12/2000 | Kuroiwa et al. | |
| 6,179,496 B1 | 1/2001 | Cho | |
| 6,181,322 B1 | 1/2001 | Nanavati | |
| 6,184,868 B1 | 2/2001 | Shahoian et al. | |
| 6,188,389 B1 | 2/2001 | Yen | |
| 6,188,391 B1 | 2/2001 | Seely et al. | 345/173 |
| 6,188,393 B1 | 2/2001 | Shu | |
| 6,191,774 B1 | 2/2001 | Schena et al. | |
| 6,198,473 B1 | 3/2001 | Armstrong | |
| 6,198,515 B1 | 3/2001 | Cole | 348/836 |
| 6,208,329 B1 | 3/2001 | Ballare | 345/173 |
| 6,211,860 B1 | 4/2001 | Bunsen | |
| 6,211,861 B1 | 4/2001 | Rosenberg | |
| 6,219,038 B1 | 4/2001 | Cho | |
| 6,222,465 B1 | 4/2001 | Kumar et al. | 341/20 |
| 6,222,528 B1 | 4/2001 | Gerpheide et al. | |
| D442,592 S | 5/2001 | Ledbetter et al. | |
| 6,225,976 B1 | 5/2001 | Yates et al. | |
| 6,225,980 B1 | 5/2001 | Weiss et al. | |
| 6,226,534 B1 | 5/2001 | Aizawa | |
| 6,232,957 B1 | 5/2001 | Hinckley | |
| 6,239,790 B1 | 5/2001 | Martinelli et al. | 345/174 |
| D443,616 S | 6/2001 | Fisher et al. | |
| 6,243,071 B1 | 6/2001 | Shwarts et al. | 345/146 |
| 6,243,078 B1 | 6/2001 | Rosenberg | |
| 6,246,862 B1 | 6/2001 | Grivas et al. | 455/90 |
| 6,249,606 B1 | 6/2001 | Kiraly et al. | 382/195 |
| 6,256,011 B1 | 7/2001 | Culver | |
| 6,262,716 B1 | 7/2001 | Raasch | |
| 6,262,717 B1 | 7/2001 | Donohue et al. | |
| 6,266,050 B1 | 7/2001 | Oh et al. | |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,297,795 B1 | 10/2001 | Kato et al. | |
| 6,297,811 B1 | 10/2001 | Kent et al. | |
| 6,310,610 B1 | 10/2001 | Beaton et al. | |
| 6,323,843 B2 | 11/2001 | Giles et al. | |
| 6,323,845 B1 | 11/2001 | Robbins | |
| 6,323,846 B1 | 11/2001 | Westerman et al. | |
| 6,323,849 B1 | 11/2001 | Westerman et al. | 345/173 |
| 6,327,011 B2 | 12/2001 | Kim | |
| 6,333,734 B1 | 12/2001 | Rein | |
| 6,337,678 B1 | 1/2002 | Fish | |
| 6,337,919 B1 | 1/2002 | Dunton | |
| 6,340,800 B1 | 1/2002 | Zhai et al. | |
| 6,347,290 B1 | 2/2002 | Bartlett | 702/150 |
| D454,568 S | 3/2002 | Andre et al. | |
| 6,356,287 B1 | 3/2002 | Ruberry et al. | |
| 6,356,524 B2 | 3/2002 | Aratani | |
| 6,362,811 B1 | 3/2002 | Edwards et al. | |
| 6,369,797 B1 | 4/2002 | Maynard | |
| 6,373,470 B1 | 4/2002 | Andre et al. | |
| 6,377,009 B1 | 4/2002 | Philipp | 318/468 |
| 6,377,530 B1 | 4/2002 | Burrows | |
| 6,380,931 B1 | 4/2002 | Gillespie et al. | 345/173 |
| 6,384,743 B1 | 5/2002 | Vanderheiden | |
| 6,392,632 B1 | 5/2002 | Lee | |
| 6,392,634 B1 | 5/2002 | Bowers et al. | |
| 6,392,636 B1 | 5/2002 | Ferrari et al. | |
| 6,396,477 B1 | 5/2002 | Hinckley et al. | |
| 6,411,287 B1 | 6/2002 | Scharff et al. | 345/177 |
| 6,413,233 B1 | 7/2002 | Sites et al. | |
| 6,414,671 B1 | 7/2002 | Gillespie et al. | 345/157 |

(56) References Cited

U.S. PATENT DOCUMENTS

| | | |
|---|---|---|
| 6,421,234 B1 | 7/2002 | Ricks et al. ............... 361/683 |
| 6,429,846 B2 | 8/2002 | Rosenberg et al. |
| 6,429,852 B1 | 8/2002 | Adams et al. |
| 6,433,780 B1 | 8/2002 | Gordon et al. |
| 6,452,514 B1 | 9/2002 | Philipp ............... 341/33 |
| 6,456,275 B1 | 9/2002 | Hinckley et al. |
| 6,457,355 B1 | 10/2002 | Philipp ............... 73/304 |
| 6,466,036 B1 | 10/2002 | Philipp ............... 324/678 |
| 6,466,203 B2 | 10/2002 | Van Ee |
| 6,469,693 B1 | 10/2002 | Chiang et al. |
| 6,489,947 B2 | 12/2002 | Hesley et al. |
| 6,492,979 B1* | 12/2002 | Kent et al. ............... 345/173 |
| 6,498,601 B1 | 12/2002 | Gujar et al. |
| 6,504,530 B1 | 1/2003 | Wilson et al. |
| 6,505,088 B1 | 1/2003 | Simkin et al. |
| 6,513,717 B2 | 2/2003 | Hannigan |
| 6,515,669 B1 | 2/2003 | Mohri ............... 345/474 |
| 6,525,749 B1 | 2/2003 | Moran et al. ............... 345/863 |
| 6,535,200 B2 | 3/2003 | Philipp ............... 345/168 |
| 6,543,684 B1 | 4/2003 | White et al. ............... 234/379 |
| 6,543,947 B2 | 4/2003 | Lee ............... 400/489 |
| 6,545,665 B2 | 4/2003 | Rodgers |
| 6,559,830 B1 | 5/2003 | Hinckley et al. |
| 6,559,831 B1 | 5/2003 | Armstrong |
| 6,567,073 B1 | 5/2003 | Levin |
| 6,570,557 B1 | 5/2003 | Westerman et al. ......... 345/173 |
| 6,587,091 B2 | 7/2003 | Serpa |
| 6,587,093 B1 | 7/2003 | Shaw et al. |
| 6,593,916 B1 | 7/2003 | Aroyan ............... 345/173 |
| 6,597,347 B1 | 7/2003 | Yasutake |
| 6,597,384 B1 | 7/2003 | Harrison |
| 6,610,936 B2 | 8/2003 | Gillespie et al. ............... 178/18.01 |
| 6,614,422 B1 | 9/2003 | Rafii et al. |
| 6,624,803 B1 | 9/2003 | Vanderheiden et al. |
| 6,624,833 B1 | 9/2003 | Kumar et al. ............... 345/863 |
| 6,636,197 B1 | 10/2003 | Goldenberg et al. |
| 6,639,577 B2 | 10/2003 | Eberhard ............... 345/102 |
| 6,639,584 B1 | 10/2003 | Li |
| 6,650,319 B1 | 11/2003 | Hurst et al. ............... 345/173 |
| 6,650,975 B2 | 11/2003 | Ruffner |
| 6,658,994 B1 | 12/2003 | McMillan ............... 99/468 |
| 6,661,410 B2 | 12/2003 | Casebolt et al. |
| 6,670,894 B2 | 12/2003 | Mehring ............... 341/22 |
| 6,677,927 B1 | 1/2004 | Bruck et al. |
| 6,677,932 B1 | 1/2004 | Westerman ............... 345/173 |
| 6,677,934 B1 | 1/2004 | Blanchard ............... 345/173 |
| 6,686,904 B1 | 2/2004 | Sherman et al. |
| 6,690,387 B2 | 2/2004 | Zimmerman et al. |
| 6,700,564 B2 | 3/2004 | McLoone |
| 6,703,550 B2 | 3/2004 | Chu |
| 6,703,599 B1 | 3/2004 | Casebolt et al. |
| 6,707,027 B2 | 3/2004 | Liess et al. |
| 6,717,569 B1 | 4/2004 | Gruhl et al. |
| 6,717,573 B1 | 4/2004 | Shahoian et al. |
| 6,724,366 B2 | 4/2004 | Crawford ............... 345/157 |
| 6,724,817 B1 | 4/2004 | Simpson et al. |
| 6,725,064 B1 | 4/2004 | Wakamatsu et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,757,002 B1 | 6/2004 | Oross et al. ............... 345/864 |
| D493,157 S | 7/2004 | Yang |
| D493,158 S | 7/2004 | Yang |
| 6,762,751 B2 | 7/2004 | Kuan |
| 6,788,288 B2 | 9/2004 | Ano |
| 6,791,533 B2 | 9/2004 | Su |
| 6,792,398 B1 | 9/2004 | Handley et al. |
| 6,795,056 B2 | 9/2004 | Norskog et al. |
| 6,795,057 B2 | 9/2004 | Gordon |
| D497,606 S | 10/2004 | Yang |
| 6,803,906 B1 | 10/2004 | Morrison et al. ............... 345/173 |
| 6,816,149 B1 | 11/2004 | Alsleben |
| 6,816,150 B2 | 11/2004 | Casebolt et al. |
| 6,819,312 B2 | 11/2004 | Fish |
| 6,822,635 B2 | 11/2004 | Shahoian et al. |
| D500,298 S | 12/2004 | Yang |
| 6,828,958 B2 | 12/2004 | Davenport |
| 6,833,825 B1 | 12/2004 | Farag et al. |
| 6,834,195 B2 | 12/2004 | Brandenberg et al. |
| 6,834,373 B2 | 12/2004 | Dieberger |
| 6,842,672 B1 | 1/2005 | Straub et al. ............... 701/3 |
| 6,844,871 B1 | 1/2005 | Hinckley et al. |
| 6,844,872 B1 | 1/2005 | Farag et al. |
| 6,847,352 B2 | 1/2005 | Lantigua |
| 6,848,014 B2 | 1/2005 | Landron et al. |
| 6,853,850 B2 | 2/2005 | Shim et al. |
| 6,856,259 B1 | 2/2005 | Sharp ............... 341/5 |
| 6,865,718 B2 | 3/2005 | Levi |
| 6,873,715 B2 | 3/2005 | Kuo et al. |
| 6,876,891 B1 | 4/2005 | Schuler et al. |
| 6,888,532 B2 | 5/2005 | Wong et al. |
| 6,888,536 B2 | 5/2005 | Westerman et al. ............... 345/173 |
| 6,900,795 B1 | 5/2005 | Knight, III et al. ............... 345/173 |
| 6,909,424 B2 | 6/2005 | Liebenow et al. |
| 6,924,789 B2 | 8/2005 | Bick |
| 6,927,761 B2 | 8/2005 | Badaye et al. ............... 345/173 |
| D509,819 S | 9/2005 | Yang |
| D509,833 S | 9/2005 | Yang |
| D510,081 S | 9/2005 | Yang |
| 6,942,571 B1 | 9/2005 | McAllister et al. ............... 463/20 |
| 6,943,779 B2 | 9/2005 | Satoh et al. |
| 6,950,094 B2 | 9/2005 | Gordon et al. |
| D511,512 S | 11/2005 | Yang |
| D511,528 S | 11/2005 | Yang |
| 6,965,375 B1 | 11/2005 | Gettemy et al. ............... 345/173 |
| D512,403 S | 12/2005 | Yang |
| D512,435 S | 12/2005 | Yang |
| 6,972,401 B2 | 12/2005 | Akitt et al. ............... 250/221 |
| 6,977,666 B1 | 12/2005 | Hedrick ............... 345/690 |
| 6,985,801 B1 | 1/2006 | Straub et al. ............... 701/3 |
| 6,992,656 B2 | 1/2006 | Hughes |
| 6,992,659 B2 | 1/2006 | Gettemy ............... 345/173 |
| 6,995,744 B1 | 2/2006 | Moore et al. |
| 7,013,228 B2 | 3/2006 | Ritt |
| 7,015,894 B2 | 3/2006 | Morohoshi |
| 7,031,228 B2 | 4/2006 | Born et al. ............... 368/69 |
| 7,034,802 B1 | 4/2006 | Gettemy et al. |
| D520,516 S | 5/2006 | Yang |
| 7,046,230 B2 | 5/2006 | Zadesky et al. |
| 7,051,291 B2 | 5/2006 | Sciammarella et al. |
| 7,054,965 B2* | 5/2006 | Bell ............... G06F 1/1626 |
| | | 345/1.1 |
| 7,068,256 B1 | 6/2006 | Gettemy et al. |
| 7,109,978 B2 | 9/2006 | Gillespie et al. |
| 7,113,196 B2 | 9/2006 | Kerr |
| 7,119,792 B1 | 10/2006 | Andre et al. |
| 7,129,416 B1 | 10/2006 | Steinfeld et al. |
| 7,142,193 B2 | 11/2006 | Hayama |
| 7,145,552 B2 | 12/2006 | Hollingsworth |
| 7,164,412 B2 | 1/2007 | Kao |
| 7,168,047 B1 | 1/2007 | Huppi |
| 7,170,488 B2 | 1/2007 | Kehlstadt et al. |
| 7,170,496 B2 | 1/2007 | Middleton |
| 7,183,948 B2 | 2/2007 | Roberts |
| 7,184,064 B2 | 2/2007 | Zimmerman et al. |
| 7,191,024 B2 | 3/2007 | Shimizu |
| 7,233,318 B2 | 6/2007 | Farag |
| 7,236,159 B1 | 6/2007 | Siversson |
| 7,239,800 B2 | 7/2007 | Bilbrey |
| 7,240,289 B2 | 7/2007 | Naughton |
| 7,312,981 B2 | 12/2007 | Carroll |
| 7,336,260 B2 | 2/2008 | Martin et al. |
| RE40,153 E | 3/2008 | Westerman et al. |
| 7,366,995 B2 | 4/2008 | Montague et al. |
| 7,388,578 B2 | 6/2008 | Tao |
| 7,423,636 B2 | 9/2008 | Sano et al. |
| 7,452,098 B2 | 11/2008 | Kerr |
| 7,453,439 B1 | 11/2008 | Kushler et al. |
| 7,495,659 B2 | 2/2009 | Marriott et al. |
| 7,499,039 B2 | 3/2009 | Nishikawa et al. |
| 7,499,040 B2 | 3/2009 | Zadesky et al. |
| 7,505,785 B2 | 3/2009 | Callaghan et al. |
| D592,665 S | 5/2009 | Andre et al. |
| 7,629,961 B2 | 12/2009 | Casebolt et al. |

(56) References Cited

U.S. PATENT DOCUMENTS

| | | |
|---|---|---|
| 7,652,589 B2 | 1/2010 | Autor |
| 7,663,607 B2 | 2/2010 | Hotelling et al. |
| 7,683,889 B2 | 3/2010 | Rimas Ribikauskas |
| 7,800,592 B2 | 9/2010 | Kerr et al. |
| 7,808,479 B1 | 10/2010 | Hotelling et al. |
| 8,479,122 B2 | 7/2013 | Hotelling et al. |
| 8,537,115 B2 | 9/2013 | Hotelling et al. |
| 8,665,209 B2 | 3/2014 | Rimas-Ribikauskas |
| 8,704,769 B2 | 4/2014 | Hotelling et al. |
| 8,704,770 B2 | 4/2014 | Hotelling et al. |
| 9,047,009 B2 | 6/2015 | King et al. |
| 9,335,868 B2 | 5/2016 | Hotelling et al. |
| 9,785,258 B2 | 10/2017 | Hotelling et al. |
| 9,983,742 B2 | 5/2018 | King et al. |
| 10,156,914 B2 | 12/2018 | Hotelling et al. |
| 2001/0011991 A1 | 8/2001 | Wang et al. |
| 2001/0011995 A1 | 8/2001 | Hinckley et al. |
| 2001/0035854 A1 | 11/2001 | Rosenberg et al. |
| 2001/0040558 A1 | 11/2001 | Takala et al. |
| 2001/0043189 A1 | 11/2001 | Brisebois et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0008691 A1* | 1/2002 | Hanajima et al. ............ 345/173 |
| 2002/0015024 A1 | 2/2002 | Westerman et al. |
| 2002/0033795 A1 | 3/2002 | Shahoian et al. |
| 2002/0033848 A1 | 3/2002 | Sciammarella et al. |
| 2002/0063688 A1 | 5/2002 | Shaw et al. |
| 2002/0067334 A1 | 6/2002 | Hinckley et al. |
| 2002/0084986 A1 | 7/2002 | Armstrong |
| 2002/0089545 A1 | 7/2002 | Levi |
| 2002/0093487 A1 | 7/2002 | Rosenberg |
| 2002/0093492 A1 | 7/2002 | Baron |
| 2002/0118169 A1 | 8/2002 | Hinckley et al. |
| 2002/0118174 A1 | 8/2002 | Rodgers |
| 2002/0118848 A1 | 8/2002 | Karpenstein ................. 381/119 |
| 2002/0130839 A1 | 9/2002 | Wallace et al. |
| 2002/0130841 A1 | 9/2002 | Scott |
| 2002/0140676 A1 | 10/2002 | Kao |
| 2002/0154090 A1 | 10/2002 | Lin |
| 2002/0158838 A1 | 10/2002 | Smith et al. |
| 2002/0164156 A1 | 11/2002 | Bilbrey |
| 2002/0169017 A1 | 11/2002 | Visoenik |
| 2002/0180763 A1 | 12/2002 | Kung |
| 2002/0190975 A1 | 12/2002 | Kerr |
| 2003/0002246 A1 | 1/2003 | Kerr |
| 2003/0006974 A1 | 1/2003 | Clough et al. ................ 345/179 |
| 2003/0011574 A1 | 1/2003 | Goodman |
| 2003/0025735 A1 | 2/2003 | Polgar et al. |
| 2003/0038776 A1 | 2/2003 | Rosenberg et al. |
| 2003/0043121 A1 | 3/2003 | Chen |
| 2003/0043174 A1 | 3/2003 | Hinckley et al. |
| 2003/0048260 A1 | 3/2003 | Matusis |
| 2003/0050092 A1 | 3/2003 | Yun |
| 2003/0063072 A1 | 4/2003 | Brandenberg et al. |
| 2003/0074977 A1* | 4/2003 | Doemens et al. ............... 73/818 |
| 2003/0076301 A1 | 4/2003 | Tsuk et al. .................... 345/159 |
| 2003/0076303 A1 | 4/2003 | Huppi ........................... 345/163 |
| 2003/0076306 A1 | 4/2003 | Zadesky et al. ............ 345/173 |
| 2003/0085870 A1 | 5/2003 | Hinckley |
| 2003/0085882 A1* | 5/2003 | Lu ......................... G06F 3/0414 345/173 |
| 2003/0095095 A1 | 5/2003 | Pihlaja ......................... 345/156 |
| 2003/0095096 A1 | 5/2003 | Robbin et al. ................ 345/156 |
| 2003/0098851 A1 | 5/2003 | Brink |
| 2003/0098858 A1 | 5/2003 | Perski et al. ................. 345/173 |
| 2003/0107551 A1 | 6/2003 | Dunker |
| 2003/0107552 A1 | 6/2003 | Lu |
| 2003/0107607 A1 | 6/2003 | Nguyen |
| 2003/0117377 A1 | 6/2003 | Horie et al. |
| 2003/0122779 A1 | 7/2003 | Martin et al. |
| 2003/0142855 A1 | 7/2003 | Kuo et al. |
| 2003/0156098 A1 | 8/2003 | Shaw et al. |
| 2003/0179223 A1 | 9/2003 | Ying et al. |
| 2003/0184517 A1 | 10/2003 | Senzui et al. |
| 2003/0184520 A1 | 10/2003 | Wei |
| 2003/0206162 A1 | 11/2003 | Roberts |
| 2003/0206202 A1 | 11/2003 | Moriya ......................... 345/846 |
| 2003/0210286 A1 | 11/2003 | Gerpheide et al. |
| 2003/0222848 A1 | 12/2003 | Solomon et al. |
| 2003/0222858 A1 | 12/2003 | Kobayashi |
| 2003/0234768 A1 | 12/2003 | Rekimoto et al. ............ 345/169 |
| 2004/0003947 A1 | 1/2004 | Kesselman et al. |
| 2004/0012572 A1 | 1/2004 | Sowden et al. |
| 2004/0021643 A1 | 2/2004 | Hoshina et al. |
| 2004/0046739 A1 | 3/2004 | Gettemy |
| 2004/0046741 A1 | 3/2004 | Low et al. |
| 2004/0075676 A1 | 4/2004 | Rosenberg et al. |
| 2004/0099131 A1 | 5/2004 | Ludwig |
| 2004/0109013 A1 | 6/2004 | Goertz |
| 2004/0125086 A1* | 7/2004 | Hagermoser et al. ........ 345/173 |
| 2004/0130526 A1 | 7/2004 | Rosenberg |
| 2004/0138569 A1 | 7/2004 | Grunwald et al. |
| 2004/0139348 A1 | 7/2004 | Norris, Jr. |
| 2004/0156192 A1 | 8/2004 | Kerr et al. |
| 2004/0212586 A1 | 10/2004 | Denny, III |
| 2004/0222979 A1 | 11/2004 | Knighton |
| 2004/0227736 A1 | 11/2004 | Kamrath et al. |
| 2004/0239622 A1 | 12/2004 | Proctor et al. |
| 2004/0242269 A1 | 12/2004 | Fadell |
| 2004/0242295 A1 | 12/2004 | Ghaly |
| 2004/0246231 A1 | 12/2004 | Large |
| 2004/0252109 A1 | 12/2004 | Trent, Jr. et al. |
| 2004/0263483 A1 | 12/2004 | Aufderheide |
| 2004/0263484 A1 | 12/2004 | Montysalo et al. .......... 345/173 |
| 2005/0012723 A1 | 1/2005 | Pallakoff ....................... 345/173 |
| 2005/0030278 A1 | 2/2005 | Fu |
| 2005/0035951 A1 | 2/2005 | Bjorkengren |
| 2005/0035955 A1 | 2/2005 | Carter et al. |
| 2005/0043060 A1 | 2/2005 | Brandenberg et al. |
| 2005/0048955 A1 | 3/2005 | Ring |
| 2005/0052425 A1 | 3/2005 | Zadesky et al. ............ 345/173 |
| 2005/0057524 A1 | 3/2005 | Hill et al. |
| 2005/0068322 A1 | 3/2005 | Falcioni |
| 2005/0084138 A1 | 4/2005 | Inkster et al. |
| 2005/0104867 A1 | 5/2005 | Westerman et al. .......... 345/173 |
| 2005/0110767 A1 | 5/2005 | Gomes et al. |
| 2005/0110768 A1 | 5/2005 | Marriott et al. ............ 345/173 |
| 2005/0115816 A1 | 6/2005 | Gelfond et al. |
| 2005/0135053 A1 | 6/2005 | Carroll |
| 2005/0146509 A1 | 7/2005 | Geaghan et al. |
| 2005/0146513 A1 | 7/2005 | Hill et al. |
| 2005/0154798 A1* | 7/2005 | Nurmi ............................... 710/1 |
| 2005/0168488 A1 | 8/2005 | Montague |
| 2005/0183035 A1 | 8/2005 | Ringel et al. |
| 2005/0190158 A1 | 9/2005 | Casebolt et al. |
| 2005/0212760 A1 | 9/2005 | Marvit et al. |
| 2005/0219228 A1 | 10/2005 | Alameh |
| 2005/0228320 A1 | 10/2005 | Klinghult |
| 2005/0253818 A1 | 11/2005 | Nettamo |
| 2005/0259077 A1 | 11/2005 | Adams |
| 2005/0264540 A1 | 12/2005 | Niwa |
| 2005/0275637 A1 | 12/2005 | Hinckley et al. |
| 2006/0010400 A1 | 1/2006 | Dehlin et al. |
| 2006/0022955 A1 | 2/2006 | Kennedy ....................... 345/173 |
| 2006/0022956 A1 | 2/2006 | Lengeling et al. ............ 345/173 |
| 2006/0026521 A1 | 2/2006 | Hotelling et al. ............ 715/702 |
| 2006/0026535 A1 | 2/2006 | Hotelling et al. ............ 715/863 |
| 2006/0026536 A1 | 2/2006 | Hotelling et al. ............ 715/863 |
| 2006/0032680 A1 | 2/2006 | Elias et al. ................. 178/18.06 |
| 2006/0033724 A1 | 2/2006 | Chaudhri et al. ............ 345/173 |
| 2006/0044259 A1 | 3/2006 | Hotelling et al. |
| 2006/0050011 A1 | 3/2006 | Kamio |
| 2006/0053387 A1 | 3/2006 | Ording ......................... 715/773 |
| 2006/0066582 A1 | 3/2006 | Lyon et al. .................... 345/173 |
| 2006/0073272 A1 | 4/2006 | Carel |
| 2006/0079969 A1* | 4/2006 | Seguin ............................. 700/80 |
| 2006/0085757 A1 | 4/2006 | Andre et al. ................. 715/771 |
| 2006/0097991 A1 | 5/2006 | Hotelling et al. ............ 345/173 |
| 2006/0109252 A1 | 5/2006 | Kolmykov-Zotov et al. |
| 2006/0109256 A1 | 5/2006 | Grant et al. |
| 2006/0146036 A1 | 7/2006 | Prados et al. |
| 2006/0181517 A1 | 8/2006 | Zadesky et al. |
| 2006/0181518 A1 | 8/2006 | Shen et al. |

(56) References Cited

U.S. PATENT DOCUMENTS

| | | |
|---|---|---|
| 2006/0183505 A1 | 8/2006 | Willrich |
| 2006/0197750 A1 | 9/2006 | Kerr et al. |
| 2006/0197753 A1 | 9/2006 | Hotelling .................. 345/173 |
| 2006/0238517 A1 | 10/2006 | King et al. |
| 2006/0238522 A1 | 10/2006 | Westerman et al. |
| 2006/0244733 A1 | 11/2006 | Geaghan |
| 2006/0250357 A1 | 11/2006 | Safai |
| 2006/0267934 A1 | 11/2006 | Harley et al. |
| 2006/0267953 A1 | 11/2006 | Peterson et al. |
| 2006/0279548 A1 | 12/2006 | Geaghan |
| 2006/0284855 A1 | 12/2006 | Shintome |
| 2007/0043725 A1 | 2/2007 | Hotelling et al. |
| 2007/0046646 A1 | 3/2007 | Kwon et al. |
| 2007/0063923 A1 | 3/2007 | Koenig |
| 2007/0075968 A1 | 4/2007 | Hall et al. |
| 2007/0136064 A1 | 6/2007 | Carroll |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0012835 A1 | 1/2008 | Rimon et al. |
| 2008/0012838 A1 | 1/2008 | Rimon |
| 2008/0088602 A1 | 4/2008 | Hotelling |
| 2008/0158172 A1 | 7/2008 | Hotelling et al. |
| 2008/0211772 A1 | 9/2008 | Loucks |
| 2008/0238879 A1* | 10/2008 | Jaeger et al. .................. 345/173 |
| 2008/0266257 A1 | 10/2008 | Chiang |
| 2008/0278450 A1 | 11/2008 | Lashina |
| 2008/0297476 A1 | 12/2008 | Hotelling et al. |
| 2008/0297477 A1 | 12/2008 | Hotelling et al. |
| 2008/0297478 A1 | 12/2008 | Hotelling et al. |
| 2009/0066670 A1 | 3/2009 | Hotelling et al. |
| 2009/0085894 A1 | 4/2009 | Gandhi et al. |
| 2009/0096757 A1 | 4/2009 | Hotelling et al. |
| 2009/0096758 A1 | 4/2009 | Hotelling et al. |
| 2009/0295738 A1 | 12/2009 | Chiang |
| 2009/0295753 A1 | 12/2009 | King et al. |
| 2010/0026656 A1 | 2/2010 | Hotelling et al. |
| 2010/0164878 A1 | 7/2010 | Bestle et al. |
| 2011/0012835 A1 | 1/2011 | Hotelling et al. |
| 2012/0299859 A1 | 11/2012 | Kinoshita |
| 2015/0062050 A1 | 3/2015 | Zadesky et al. |
| 2015/0153895 A1 | 6/2015 | Hotelling |
| 2015/0261362 A1 | 9/2015 | Hotelling et al. |
| 2016/0070399 A1 | 3/2016 | Hotelling |
| 2016/0197753 A1 | 7/2016 | Hwang et al. |
| 2018/0032158 A1 | 2/2018 | Hotelling |
| 2018/0217709 A1 | 8/2018 | Hotelling |
| 2019/0041991 A1 | 2/2019 | Hotelling et al. |
| 2019/0113988 A1 | 4/2019 | Hotelling et al. |

FOREIGN PATENT DOCUMENTS

| | | | | |
|---|---|---|---|---|
| CN | 1173672 A | 2/1998 | | |
| CN | 1263309 A | 8/2000 | | |
| CN | 1304345 A | 7/2001 | | |
| CN | 1343330 A | 4/2002 | | |
| CN | 1397870 A | 2/2003 | | |
| CN | 1430745 A | 7/2003 | | |
| CN | 1455615 A | 11/2003 | | |
| CN | 1496549 A | 5/2004 | | |
| CN | 1529869 A | 9/2004 | | |
| CN | 1582453 A | 2/2005 | | |
| CN | 1582465 A | 2/2005 | | |
| CN | 1588432 A | 3/2005 | | |
| CN | 1720499 A | 1/2006 | | |
| CN | 1737827 A | 2/2006 | | |
| CN | 1942853 A | 4/2007 | | |
| DE | 4125049 | 1/1992 | | |
| DE | 19722636 A1 | 12/1998 | | |
| DE | 10022537 A1 | 11/2000 | | |
| DE | 10201193 | 7/2003 | | |
| DE | 102 51 296 | 5/2004 | ............ | G06F 3/023 |
| EP | 0288692 A2 | 11/1988 | | |
| EP | 0464908 A2 | 1/1992 | | |
| EP | 0 498 540 A2 | 8/1992 | | |
| EP | 0 288 692 | 7/1993 | ............ | G06K 11/06 |
| EP | 0 653 725 | 5/1995 | | |
| EP | 0 664 504 | 7/1995 | ............ | G06F 3/033 |
| EP | 0 464 908 | 9/1996 | ............ | G06K 11/16 |
| EP | 0 768 619 A1 | 4/1997 | | |
| EP | 0 795 837 | 9/1997 | | |
| EP | 0 880 091 A2 | 11/1998 | | |
| EP | 1 026 713 A1 | 8/2000 | | |
| EP | 1026570 A2 | 8/2000 | | |
| EP | 1112822 A1 | 7/2001 | | |
| EP | 1 014 295 | 1/2002 | ............ | G06K 11/06 |
| EP | 1 241 557 | 9/2002 | | |
| EP | 1 241 558 | 9/2002 | | |
| EP | 1 505 484 A1 | 2/2005 | | |
| EP | 0 899 650 B1 | 6/2011 | | |
| GB | 2 380 583 A | 4/2003 | | |
| GB | 2393688 A | 4/2004 | | |
| GB | 2393688 B | 1/2006 | | |
| JP | 63-106826 A | 5/1988 | | |
| JP | 63-257824 A | 10/1988 | | |
| JP | 63-292774 A | 11/1988 | | |
| JP | 03-237520 A | 10/1991 | | |
| JP | 07-064725 A | 3/1995 | | |
| JP | H-07-160396 A | 6/1995 | | |
| JP | 07-182101 A | 7/1995 | | |
| JP | 07-319001 A | 12/1995 | | |
| JP | 08-161138 A | 6/1996 | | |
| JP | 8-166866 A | 6/1996 | | |
| JP | 08-211992 A | 8/1996 | | |
| JP | 09-006525 A | 1/1997 | | |
| JP | 09-244810 A | 9/1997 | | |
| JP | 9-305262 A | 11/1997 | | |
| JP | 10-228350 A * | 8/1998 | | |
| JP | 10-326149 A | 12/1998 | | |
| JP | 11-143606 A | 5/1999 | | |
| JP | 11-194863 A | 7/1999 | | |
| JP | 11-194872 A | 7/1999 | | |
| JP | 11-194883 A | 7/1999 | | |
| JP | 11-215217 A | 8/1999 | | |
| JP | 2000-163031 A | 6/2000 | | |
| JP | 2000-215549 A | 8/2000 | | |
| JP | 2000-242424 A | 9/2000 | | |
| JP | 2000-242428 A | 9/2000 | | |
| JP | 2000-293289 A | 10/2000 | | |
| JP | 2000-330946 A | 11/2000 | | |
| JP | 2001-051790 A | 2/2001 | | |
| JP | 2001-356878 A | 12/2001 | | |
| JP | 2002-501271 A | 1/2002 | | |
| JP | 2002-062972 A | 2/2002 | | |
| JP | 2002-185630 A | 6/2002 | | |
| JP | 2002-229719 A | 8/2002 | | |
| JP | 2002-342033 A | 11/2002 | | |
| JP | 2002-342034 A | 11/2002 | | |
| JP | 2003-058316 A | 2/2003 | | |
| JP | 2003-280807 A | 2/2003 | | |
| JP | 2003-122506 A | 4/2003 | | |
| JP | 2003-241872 A | 8/2003 | | |
| JP | 2003-271309 A | 9/2003 | | |
| JP | 2003-330611 A | 11/2003 | | |
| JP | 2004-21933 A | 1/2004 | | |
| JP | 2004-070920 A | 3/2004 | | |
| JP | 2004-177993 A | 6/2004 | | |
| JP | 2004-226715 A | 8/2004 | | |
| JP | 2004-527847 A | 9/2004 | | |
| JP | 2004-340991 A | 12/2004 | | |
| JP | 2005-006259 A | 1/2005 | | |
| JP | 2005-346244 A | 12/2005 | | |
| KR | 2001-0047975 A | 6/2001 | | |
| KR | 10-2002-0016080 A | 3/2002 | | |
| TW | 431607 | 4/2001 | | |
| WO | WO-90/05972 A1 | 5/1990 | | |
| WO | WO-92/10823 A1 | 6/1992 | | |
| WO | WO-94/17494 A2 | 8/1994 | | |
| WO | 1997/018547 | 5/1997 | ............ | G09G 5/00 |
| WO | 1997/022107 A1 | 6/1997 | | |
| WO | 1997/023738 | 7/1997 | ............ | F16K 31/06 |
| WO | 1998/14863 | 4/1998 | ............ | G06F 3/14 |
| WO | WO-99/26330 A2 | 5/1999 | | |

(56) References Cited

FOREIGN PATENT DOCUMENTS

| WO | WO-99/38149 A1 | 7/1999 | |
|---|---|---|---|
| WO | WO-99/49443 A2 | 9/1999 | |
| WO | WO-00/39907 | 7/2000 | |
| WO | WO-02/35461 A1 | 5/2002 | |
| WO | WO-02/052494 | 7/2002 | |
| WO | 2003/007227 A2 | 1/2003 | |
| WO | WO-03/001576 | 1/2003 | |
| WO | 2003/001576 A3 | 4/2003 | |
| WO | WO-03/065192 A1 | 8/2003 | |
| WO | WO-03/077110 A2 | 9/2003 | |
| WO | 2003/088176 | 10/2003 | ............. G08C 21/00 |
| WO | 2004/001576 A1 | 12/2003 | |
| WO | 2004/111827 A1 | 12/2004 | |
| WO | WO-2004/111816 A2 | 12/2004 | |
| WO | WO-2004/111816 A3 | 12/2004 | |
| WO | 2005/052773 A2 | 6/2005 | |
| WO | 2006/020305 A2 | 2/2006 | |
| WO | 2006/023569 | 3/2006 | ............. G06F 3/044 |
| WO | WO-2006/094308 A2 | 9/2006 | |
| WO | WO-2006/094308 A3 | 9/2006 | |
| WO | WO-2006/096501 A1 | 9/2006 | |
| WO | WO-2006/132817 A2 | 12/2006 | |
| WO | WO-2006/132817 A3 | 12/2006 | |
| WO | WO-2007/103631 A2 | 9/2007 | |
| WO | WO-2007/103631 A3 | 9/2007 | |
| WO | WO-2010/014560 A1 | 2/2010 | |

OTHER PUBLICATIONS

U.S. Appl. No. 10/789,676, filed Feb. 27, 2004 entitled "Shape Detecting Input Device".
"4-Wire Resistive Touchscreens" obtained from http://www.touchscreens.com/intro-touchtypes-4resistive.html generated Aug. 5, 2005.
"5-Wire Resistive Touchscreens" obtained from http://www.touchscreens.com/intro-touchtypes-resistive.html generated Aug. 5, 2005.
"A Brief Overview of Gesture Recognition" obtained from http://www.dai.ed.ac.uk/Cvonline/LOCA_COPIES/COHEN/gesture_overview.html, generated Apr. 20, 2004.
"Capacitive Touchscreens" obtained from http://www.touchscreens.com/intro-touchtypes-capacitive.html generated Aug. 5, 2005.
"Capacitive Position Sensing" obtained from http://www.synaptics.com/technology/cps.cfm generated Aug. 5, 2005.
"Comparing Touch Technologies" obtained from http://www.touchscreens.com/intro-touchtypes.html generated Oct. 10, 2004.
"Gesture Recognition" http://www.fingerworks.com/gesture_recognition.html.
"GlidePoint®" obtained from http://www.cirque.com/technology/technology_gp.html generated Aug. 5, 2005.
"How do touchscreen monitors know where you're touching?" obtained from http://www.electronics.howstuffworks.com/question716.html generated Aug. 5, 2005.
"How does a touchscreen work?" obtained from http://www.touchscreens.com/intro-anatomy.html generated Aug. 5, 2005.
"IGesture Products for Everyone (learn in minutes) Product Overview" FingerWorks.com.
"Infrared Touchscreens" obtained from http://www.touchscreens.com/intro-touchtypes-infrared.html generated Aug. 5, 2005.
"Mouse Emulation" FingerWorks obtained from http://www.fingerworks.com/gesture_guide_mouse.html generated Aug. 30, 2005.
"Mouse Gestures in Opera" obtained from http://www.opera.com/products/desktop/mouse/index.dml generated Aug. 30, 2005.
"Mouse Gestures," Optim oz, May 21, 2004.
"MultiTouch Overview" FingerWorks obtained from http://www.fingerworks.com/multoverview.html generated Aug. 30, 2005.
"Near Field Imaging Touchscreens" obtained from http://www.touchscreens.com/intro-touchtypes-nfi.html generated Aug. 5, 2005.
"PenTouch Capacitive Touchscreens" obtained from http://www.touchscreens.com/intro-touchtypes-pentouch.html generated Aug. 5, 2005.
"Surface Acoustic Wave Touchscreens" obtained from http://www.touchscreens.com/intro-touchtypes-saw.html generated Aug. 5, 2005.
"Symbol Commander" obtained from http://www.sensiva.com/symbolcomander/, generated Aug. 30, 2005.
"Tips for Typing" FingerWorks http://www.fingerworks.com/mini_typing.html generated Aug. 30, 2005.
"Touch Technologies Overview" 2001, 3M Touch Systems, Massachusetts.
"Wacom Components—Technology" obtained from http://www.wacom-components.com/english/tech.asp generated on Oct. 10, 2004.
"Watershed Algorithm" http://rsb.info.nih.gov/ij/plugins/watershed.html generated Aug. 5, 2005.
"FingerWorks—Gesture Guide—Application Switching," obtained from http://www.fingerworks.com/gesture_guide_apps.html, generated on Aug. 27, 2004, 1-pg.
"FingerWorks—Gesture Guide—Editing," obtained from http://www.fingerworks.com/gesure_guide_editing.html, generated on Aug. 27, 2004, 1-pg.
"FingerWorks—Gesture Guide—File Operations," obtained from http://www.fingerworks.com/gesture_guide_files.html, generated on Aug. 27, 2004, 1-pg.
"FingerWorks—Gesture Guide—Text Manipulation," obtained from http://www.fingerworks.com/gesture_guide_text_manip.html, generated on Aug. 27, 2004, 2-pg.
"FingerWorks—Gesture Guide—Tips and Tricks," obtained from http://www.fingerworks.com/gesture_guide_tips.html, generated Aug. 27, 2004, 2-pgs.
"FingerWorks—Gesture Guide—Web," obtained from http://www.fingerworks.com/gesture_guide_web.html, generated on Aug. 27, 2004, 1-pg.
"FingerWorks—Guide to Hand Gestures for USB Touchpads," obtained from http://www.fingerworks.com/igesture_userguide.html, generated Aug. 27, 2004, 1-pg.
"FingerWorks—iGesture—Technical Details," obtained from http://www.fingerworks.com/igesture_tech.html, generated Aug. 27, 2004, 1-pg.
"FingerWorks—The Only Touchpads with Ergonomic Full-Hand Resting and Relaxation!" obtained from http://www.fingerworks.com/resting.html, Copyright 2001, 1-pg.
"FingerWorks—Tips for Typing on the Mini," obtained from http://www.fingerworks.com/mini_typing.html, generated on Aug. 27, 2004, 2-pgs.
"IGesture Pad—the MultiFinger USB TouchPad with Whole-Hand Gestures," obtained from http://www.fingerworks.com/igesture.html, generated Aug. 27, 2004, 2-pgs.
Bier, et al., "Toolglass and Magic Lenses: The see-through interface" in James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Fisher et al., "Repetitive Motion Disorders: The Design of Optimal Rate-Rest Profiles," Human Factors, 35(2):283-304 (Jun. 1993).
Fukumoto, et al., "ActiveClick: Tactile Feedback for Touch Panels," In CHI 2001 Summary, pp. 121-122, 2001.
Fukumoto and Yoshinobu Tonomura, "Body Coupled Fingering: Wireless Wearable Keyboard," *CHI 97*, pp. 147-154 (Mar. 1997).
Hardy, "Fingerworks" Mar. 7, 2002; BBC World on Line.
Hillier and Gerald J. Lieberman, *Introduction to Operations Research* (1986).
International Search Report dated Mar. 3, 2006 (PCT/US 05/03325).
Jacob et al., "Integrality and Separability of Input Devices," *ACM Transactions on Computer-Human Interaction*, 1:3-26 (Mar. 1994).
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Lee et al., "A Multi-Touch Three Dimensional Touch-Sensitive Tablet," in CHI '85 Proceedings, pp. 121-128, 2000.

(56) References Cited

OTHER PUBLICATIONS

Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Quantum Research Group "QT510 / QWheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto "SmartSkin: An Infrastructure for Freehand Manipulation on Interactive Surfaces" CHI 2002, Apr. 20-25, 2002.
Rekimoto et al., "ToolStone: Effective Use of the Physical Manipulation Vocabularies of Input Devices," in Proc. of UIST 2000, 2000.
Rubine et al., "Programmable Finger-Tracking Instrument Controllers," *Computer Music Journal*, vol. 14, No. 1 (Spring 1990).
Rutledge et al., "Force-To-Motion Functions for Pointing," Human-Computer Interaction—INTERACT (1990).
Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20-pgs.
Wellner, "The Digital Desk Calculators: Tangible Manipulation on a Desk Top Display" In ACM UIST '91 Proceedings, pp. 27-34, Nov. 1991.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
U.S. Appl. No. 10/774,053, filed Feb. 5, 2004.
U.S. Appl. No. 11/140,529, filed May 27, 2005 which is a Reissue of U.S. Pat. No. 6,570,557 listed above (see A152).
U.S. Appl. No. 11/381,313, filed May 2, 2006 entitled "Multipoint Touch Surface Controller".
U.S. Appl. No. 11/332,861, filed Jan. 13, 2006 which is a Reissue of U.S. Pat. No. 6,677,932 listed above (see A160).
U.S. Appl. No. 11/380,109, filed Apr. 25, 2006 entitled "Keystroke Tactility Arrangement on Smooth Touch Surface."
U.S. Appl. No. 11/428,501, filed Jul. 3, 2006 entitled "Capacitive Sensing Arrangement," which is a Continuation of US 2005/0104867 listed above (see A177).
U.S. Appl. No. 11/428,503, filed Jul. 3, 2006 entitled "Touch Surface" which is a Continuation of US 2005/0104867 listed above (see A177).
U.S. Appl. No. 11/428,506, filed Jul. 3, 2006 entitled "User Interface Gestures" which is a Continuation of US 2005/0104867 listed above (see A177).
U.S. Appl. No. 11/428,515, filed Jul. 3, 2006 entitled "User Interface Gestures" which is a Continuation of US 2005/0104867 listed above (see A177).
U.S. Appl. No. 11/428,522, filed Jul. 3, 2006 entitled "Identifying Contacts on a Touch Surface" which is a Continuation of US 2005/0104867 listed above (see A177).
U.S. Appl. No. 11/428,521, filed Jul. 3, 2006 entitled "Identifying Contacts on a Touch Surface" which is a Continuation of US 2005/0104867 listed above (see A177).
U.S. Appl. No. 11/426,078, filed Jun. 23, 2006 entitled "Electronic Device Having Display and Surrounding Touch Sensitive Bezel for User Interface and Control" which is a Continuation-In-Part of 2006/0197753 listed above (see A181).
U.S. Appl. No. 11/278,080, filed Mar. 30, 2006 entitled "Force Imaging Input Device and System".
U.S. Appl. No. 11/382,402, filed May 9, 2006 entitled "Force and Location Sensitive Display" which is a Continuation of U.S. Appl. No. 11/278,080 listed above (see C81).
International Search Report received in corresponding PCT application No. PCT/US2006/008349 dated Oct. 6, 2006.
European Examination Report dated Apr. 21, 2008, for EP Application No. 06737515.4, filed Mar. 3, 2006, five pages.
International Search Report dated Jan. 3, 2008, for PCT Application No. PCT/US2007/062474, filed Feb. 21, 2007, three pages.
Gear Live Review: iRiver clix Review, obtained from http://www.gearlive.com/index.php/news/article/gear-live-review-iriver-clix-review-713400/, dated Jul. 13, 2006, 8 pages.
Non-Final Office Action dated Apr. 2, 2009, for U.S. Appl. No. 11/426,078, filed Jun. 23, 2006, 21 pages.
Press Release, "iriver clix Delivers Complete Package for Portable Entertainment Fans," obtained from www.iriveramerican.com/images.pdf/iriv_clix.pdf, dated May 17, 2006, 3 pages.
Notice of Allowance dated Sep. 25, 2009, for U.S. Appl. No. 11/426,078, filed Jun. 23, 2006, 14 pages.
Non-Final Office Action dated Mar. 28, 2012, for U.S. Appl. No. 12/486,710, filed Jun. 17, 2009, 25 pages.
Final Office Action dated Jul. 1, 2011, for U.S. Appl. No. 12/486,710, filed Jun. 17, 2009, 19 pages.
Final Office Action dated Jul. 13, 2011, for U.S. Appl. No. 11/966,948, filed Dec. 28, 2007, 10 pages.
Final Office Action dated Sep. 4, 2012, for U.S. Appl. No. 12/486,710, filed Jun. 17, 2009, 25 pages.
Final Office Action dated Nov. 21, 2008, for U.S. Appl. No. 11/115,539, filed Apr. 26, 2005, 23 pages.
Final Office Action dated Oct. 14, 2009, for U.S. Appl. No. 11/115,539, filed Apr. 26, 2005, 10 pages.
International Search Report dated Jul. 25, 2006, from corresponding International Application No. PCT/US2006/007585 with Written Opinion, nine pages.
Non-Final Office Action dated Apr. 6, 2009, for U.S. Appl. No. 11/115,539, filed Apr. 26, 2005, 31 pages.
Non-Final Office Action dated Jul. 2, 2008, for U.S. Appl. No. 11/115,539, filed Apr. 26, 2005, 18 pages.
Non-Final Office Action dated Jan. 15, 2010, for U.S. Appl. No. 11/115,539, filed Apr. 26, 2005, 10 pages.
Notice of Allowance dated Jun. 2, 2010, for for U.S. Appl. No. 11/115,539, filed Apr. 26, 2005, eight pages.
Anonymous. (Apr. 13, 2004). Proximity Sensor Demo Kit, User Guide, Version 0.62—Preliminary, Integration Associates, Inc., 14 pages.
Final Office Action dated Nov. 8, 2012, for U.S. Appl. No. 12/184,190, filed Jul. 31, 2008, 20 pages.
International Search Report dated Nov. 27, 2009, for PCT Application No. PCT/US2009/051874, filed Jul. 27, 2009, three pages.
Non-Final Office Action dated Dec. 2, 2011, for U.S. Appl. No. 12/184,190, filed Jul. 31, 2008, 21 pages.
Non-Final Office Action dated Jul. 5, 2012, for U.S. Appl. No. 12/184,190, filed Jul. 31, 2008, 19 pages.
Non-Final Office Action dated Jun. 6, 2013, for U.S. Appl. No. 12/486,710, filed Jun. 17, 2009, 28 pages.
European Search Report dated Nov. 7, 2013, for EP Application No. 09170572.3, eight pages.
European Search Report dated Nov. 9, 2010, for EP Application No. 10010075.9, filed Mar. 3, 2006, six pages.
Non-Final Office Action dated Jan. 28, 2011, for U.S. Appl. No. 11/966,948, filed Dec. 28, 2007, 11 pages.
Non-Final Office Action dated Mar. 9, 2011, for U.S. Appl. No. 12/486,710, filed Jun. 17, 2009, 13 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.

(56) References Cited

OTHER PUBLICATIONS

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Jan. 29, 2015, for U.S. Appl. No. 12/486,710, filed Jun. 17, 2009, five pages.
Final Office Action dated Oct. 9, 2014, for U.S. Appl. No. 11/966,948, filed Dec. 28, 2007, 11 pages.
"About Quicktip®" www.logicad3d.com/docs/qt.html <http://www.logicad3d.com/docs/qt.html>, downloaded Apr. 8, 2002.
"Apple Unveils Optical Mouse and New Pro Keyboard," Press Release, Jul. 19, 2000.
"Der Klangmeister," Connect Magazine, Aug. 1998.
"Logitech's MX Air Is No Longer Vapor," Gizmodo Australia, retrieved from <http://www.gizmodo.com.au/2007/07/logitechs_mx_air_is_no_longer.html on Jan. 11>, 2008.
"Neuros MP3 Digital Audio Computer", www.neurosaudio.com <http://www.neurosaudio.com>, downloaded Apr. 9, 2003.
"OEM Touchpad Modules" website www.glidepoint.com/sales/modules.index.shtml <http://www.glidepoint.com/sales/modules.index.shtml>, downloaded Feb. 13, 2002.
"Product Overview—ErgoCommander®", www.logicad3d.com/products/ErgoCommander.htm <http://www.logicad3d.com/products/ErgoCommander.htm>, downloaded Apr. 8, 2002.
"Product Overview—SpaceMouse® Classic", www.logicad3d.com/products/Classic.htm <http://www.logicad3d.com/products/Classic.htm>, downloaded Apr. 8, 2002.
"Synaptics Touch Pad Interfacing Guide" Second Edition, Mar. 25, 1998, Synaptics, Inc. San Jose, CA, pp. 1 to 90.
Apple Computer, Inc., "Apple Pro Mouse," Jul. 2000, Apple Pro Mouse Design Innovations product specification, pp. 1-11.
Bang & Olufsen Telecom a/s, "BeoCom 6000 User Guide 2000". BeoCom 6000, Sales Training Brochure, date unknown.
Chapweske, Adam, "PS/2 Mouse/Keyboard Protocol", 1999, <http://panda.cs.ndsu.nodak.edu/~achapwes/PICmicro/PS2/ps2.htm>.
David Nagel, "More Details on the New Pro Keyboard and ButtonLess Mouse," Jul. 2000, <http://www.creativemac.com/HTM/News/07_00/detailskeyboardmouse,htm> pp. 1-2.
De Meyer, Kevin, Crystal Optical Mouse, Feb. 14, 2002, Heatseekerz, Web Article 19.
Dreier, Troy, "The Comfort Zone", PC Magazine, Mar. 12, 2002.
EPO Form 1507 in related EP Application No. 02761784.4 dated Nov. 19, 2004.
Final Office Action dated Feb. 2, 2007, for U.S. Appl. No. 10/654,108, filed Sep. 2, 2003, 16 pages.
Final Office Action dated Nov. 16, 2007, for U.S. Appl. No. 10/654,108, filed Sep. 2, 2003, 12 pages.
Final Office Action dated Feb. 18, 2009, for U.S. Appl. No. 10/654,108, filed Sep. 2, 2003, 12 pages.
Final Office Action dated Jan. 19, 2010, for U.S. Appl. No. 10/654,108, filed Sep. 2, 2003, 16 pages.
Final Office Action dated Apr. 19, 2011, for U.S. Appl. No. 12/890,437, filed Sep. 24, 2010, 19 pages.
Final Office Action dated Oct. 14, 2011, for U.S. Appl. No. 12/189,030, filed Aug. 8, 2008, 15 pages.
Final Office Action dated Dec. 7, 2011, for U.S. Appl. No. 12/188,948, filed Aug. 8, 2008, 13 pages.
Final Office Action dated Dec. 8, 2011, for U.S. Appl. No. 12/188,988, filed Aug. 8, 2008, 15 pages.
Final Office Action dated Jun. 20, 2013, for U.S. Appl. No. 12/189,030, filed Aug. 8, 2008, 17 pages.
Final Office Action dated Jan. 2, 2014, for U.S. Appl. No. 12/486,710, filed Jun. 17, 2009, 30 pages.
Fiore, Andrew, "Zen Touchpad", Cornell University, May 2000.
Flaminio, Michael, "IntelliMouse Explorer", IGM Review, Oct. 4, 1999.

Gadgetboy, "Point and click with the latest mice", CNETAsia Product Review, www.asia.cnet.com/reviews...are/gadgetboy/0,39001770,38023590,00.htm, downloaded Dec. 5, 2001.
Grevstad, Eric, "Microsoft Wireless IntelliMouse Explorer Review the Ultimate Pointing Machine", HardwareCentral Review, Oct. 9, 2001.
Grevstad, Eric, "Microsoft Wireless IntelliMouse Explorer Review the Ultimate Pointing Machine", HardwareCentral Review, Jun. 24, 2003.
International Search Report from related application No. PCT/US2006/020341 dated Jun. 12, 2007.
John Siracusa, "MacWorld Expo NY 2000," Jul. 2000, <http://www.arstechnic.com/wanderdesk/3q00/macworld2k/mwny-2.html> pp. 1-6.
Ken Hinckley et al. "Touch-Sensing Input Devices" CHI 1999 pp. 223-230.
Letter re: Bang & Olufsen A/S, by David Safran, Nixon Peabody, LLP, May 21, 2004.
Microsoft Inc., "Scroll and zoom on a Microsoft Excel sheet by using the Microsoft Intellimouse pointing device" 1999, pp. 1-3.
Non-Final Office Action dated Jun. 16, 2006, for U.S. Appl. No. 10/654,108, filed Sep. 2, 2003, 7 pages.
Non-Final Office Action dated Jul. 6, 2007, for U.S. Appl. No. 10/654,108, filed Sep. 2, 2003, 13 pages.
Non-Final Office Action dated Oct. 28, 2008, for U.S. Appl. No. 10/654,108, filed Sep. 2, 2003, 10 pages.
Non-Final Office Action dated Jul. 14, 2009, for U.S. Appl. No. 10/654,108, filed Sep. 2, 2003, 16 pages.
Non-Final Office Action dated Dec. 28, 2010, for U.S. Appl. No. 12/890,437, filed Sep. 24, 2010, 16 pages.
Non-Final Office Action dated May 6, 2011, for U.S. Appl. No. 12/189,030, filed Aug. 8, 2008, seven pages.
Non-Final Office Action dated May 6, 2011, for U.S. Appl. No. 12/188,948, filed Aug. 8, 2008, 10 pages.
Non-Final Office Action dated May 16, 2011, for U.S. Appl. No. 12/188,988, filed Aug. 8, 2008, 14 pages.
Non-Final Office Action dated Nov. 28, 2012, for U.S. Appl. No. 12/189,030, filed Aug. 8, 2008, 16 pages.
Non-Final Office Action dated Aug. 14, 2013, for U.S. Appl. No. 12/188,988, filed Aug. 8, 2008, 17 pages.
Non-Final Office Action dated Aug. 21, 2013, for U.S. Appl. No. 12/188,948, filed Aug. 8, 2008, 13 pages.
Non-Final Office Action dated Feb. 27, 2014, for U.S. Appl. No. 11/966,948, filed Dec. 28, 2007, 10 pages.
Notice of Allowance dated Jun. 1, 2010, for U.S. Appl. No. 10/654,108, filed Sep. 2, 2003, six pages.
Notice of Allowance dated Jun. 18, 2013, for U.S. Appl. No. 12/890,437, filed Sep. 24, 2010, 11 pages.
Notice of Allowance dated Dec. 30, 2013, for U.S. Appl. No. 12/188,988, filed Aug. 8, 2008, nine pages.
Notice of Allowance dated Jan. 2, 2014, for U.S. Appl. No. 12/188,948, filed Aug. 8, 2008, six pages.
Photographs of Innovations 2000 Best of Show award presented at the 2000 International CES Innovations 2000 Design & Engineering Showcase, 1 pg.
Sylvania, "Intellivision™ Intelligent Television Master Component Service Manual," pp. 1, 2 and 8, 1979.
Tessler et al. "Touchpads Three new input devices", website www.macworld.com/1996/02/review/1806.html, download Feb. 13, 2002.
U.S. Appl. No. 60/364,400, filed Mar. 13, 2002.
Non-Final Office Action dated Aug. 25, 2014, for U.S. Appl. No. 12/486,710, filed Jun. 17, 2009, 28 pages.
European Search Report dated Jul. 7, 2014, for EP Application No. 14169441.4, three pages.
Non-Final Office Action dated Apr. 10, 2015, for U.S. Appl. No. 14/595,032, filed Jan. 12, 2105, eleven pages.
Final Office Action dated Aug. 3, 2015, for U.S. Appl. No. 14/595,032, filed Jan. 12, 2105, nine pages.
Non-Final Office Action dated Aug. 26, 2015, for U.S. Appl. No. 11/966,948, filed Dec. 28, 2007, ten pages.
Final Office Action dated Sep. 7, 2016, for U.S. Appl. No. 11/204,873, filed Aug. 16, 2005, 25 pages.
Final Office Action dated Aug. 23, 2016, for U.S. Appl. No. 14/940,010, filed Nov. 12, 2015, 11 pages.

(56) References Cited

OTHER PUBLICATIONS

Non-Final Office Action dated Aug. 24, 2016, for U.S. Appl. No. 12/189,030, filed Aug. 8, 2008, 19 pages.
Chinese Search Report dated Jan. 14, 2016, for CN Application No. 201310264394.7, with English Translation, four pages.
Final Office Action dated Apr. 28, 2009, for U.S. Appl. No. 11/204,873, filed Aug. 16, 2005, 18 pages.
Final Office Action dated Jan. 15, 2010, for U.S. Appl. No. 11/204,873, filed Aug. 16, 2005, 23 pages.
Final Office Action dated Sep. 20, 2010, for U.S. Appl. No. 11/204,873, filed Aug. 16, 2005, 14 pages.
Final Office Action dated Jun. 20, 2011, for U.S. Appl. No. 11/204,873, filed Aug. 16, 2005, 17 pages.
Final Office Action dated Aug. 13, 2012, for U.S. Appl. No. 11/204,873, 22 pages.
Final Office Action dated Mar. 10, 2016, for U.S. Appl. No. 11/966,948, filed Dec. 28, 2007, 14 pages.
Non-Final Office Action dated Nov. 13, 2008, for U.S. Appl. No. 11/204,873, filed Aug. 16, 2005, ten pages.
Non-Final Office Action dated Sep. 30, 2009, for U.S. Appl. No. 11/204,873, filed Aug. 16, 2005, 21 pages.
Non-Final Office Action dated May 20, 2010, for U.S. Appl. No. 11/204,873, filed Aug. 16, 2005, 13 pages.
Non-Final Office Action dated Feb. 28, 2011, for U.S. Appl. No. 11/204,873, filed Aug. 16, 2005, 15 pages.
Non-Final Office Action dated Mar. 8, 2012, for U.S. Appl. No. 11/204,873, filed Aug. 16, 2005, 20 pages.
Non-Final Office Action dated Feb. 2, 2016, for U.S. Appl. No. 14/940,010, filed Nov. 12, 2015, eight pages.
Non-Final Office Action dated Apr. 6, 2016, for U.S. Appl. No. 11/204,873, filed Aug. 16, 2005, 32 pages.
Non-Final Office Action dated Apr. 20, 2016, for U.S. Appl. No. 14/724,753, filed May 28, 2015, fifteen pages.
Non-Final Office Action dated Jun. 27, 2016, for U.S. Appl. No. 14/595,032, filed Jan. 12, 2105, eight pages.
Notice of Allowance dated Jan. 11, 2016, for U.S. Appl. No. 12/184,190, filed Jul. 31, 2008, seven pages.
Non-Final Office Action dated Jun. 22, 2017, for U.S. Appl. No. 14/724,753, filed May 28, 2015, nine pages.
Non-Final Office Action dated May 17, 2017, for U.S. Appl. No. 14/940,010, filed Nov. 12, 2015, ten pages.
Notice of Allowance dated Jun. 5, 2017, for U.S. Appl. No. 12/189,030, filed Aug. 8, 2008, five pages.
Chinese Search Report dated Sep. 27, 2016, for CN Application No. 201410259240.3, with English Translation, four pages.
Final Office Action dated Feb. 4, 2016, for U.S. Appl. No. 14/535,101, filed Nov. 6, 2014, seven pages.
Final Office Action dated Nov. 25, 2016, for U.S. Appl. No. 14/724,753, filed May 28, 2015, sixteen pages.
Final Office Action dated Feb. 15, 2017, for U.S. Appl. No. 14/595,032, filed Jan. 12, 2015, nine pages.
Final Office Action dated Apr. 28, 2017, for U.S. Appl. No. 14/535,101, filed Nov. 6, 2014, nine pages.
Non-Final Office Action dated May 12, 2015, for U.S. Appl. No. 14/535,101, filed Nov. 6, 2014, seven pages.
Non-Final Office Action dated Aug. 11, 2016, for U.S. Appl. No. 14/535,101, filed Nov. 6, 2014, eight pages.
Non-Final Office Action dated Feb. 22, 2017, for U.S. Appl. No. 12/189,030, filed Aug. 8, 2008, 23 pages.
Non-Final Office Action dated Apr. 6, 2017, for U.S. Appl. No. 11/966,948, filed Dec. 28, 2007, 13 pages.
Notice of Allowance dated Jan. 24, 2018, for U.S. Appl. No. 14/724,753, filed May 28, 2015, nine pages.
Non-Final Office Action dated Aug. 9, 2017, for U.S. Appl. No. 11/204,873, filed Aug. 16, 2005, 26 pages.
Non-Final Office Action dated Nov. 2, 2017, for U.S. Appl. No. 15/727,455, filed Oct. 6, 2017, 15 pages.
Non-Final Office Action dated Nov. 15, 2017, for U.S. Appl. No. 14/535,101, filed Nov. 6, 2014, eight pages.
Final Office Action dated Feb. 2, 2018, for U.S. Appl. No. 14/940,010, filed Nov. 12, 2015, 14 pages.
European Search Report dated Mar. 5, 2018, for EP Application No. 17203125.4, four pages.
Advisory Action received for U.S. Appl. No. 10/654,108, dated Apr. 17, 2007, 3 pages.
Advisory Action received for U.S. Appl. No. 10/654,108, dated Apr. 20, 2009, 3 pages.
Advisory Action received for U.S. Appl. No. 10/654,108, dated Feb. 12, 2008, 3 pages.
Advisory Action received for U.S. Appl. No. 10/654,108, dated Mar. 25, 2010, 3 pages.
Advisory Action received for U.S. Appl. No. 11/204,873, dated Jun. 17, 2009, 3 pages.
Advisory Action received for U.S. Appl. No. 11/204,873, dated Mar. 3, 2017, 7 pages.
Advisory Action received for U.S. Appl. No. 11/204,873, dated Sep. 17, 2018, 4 pages.
Advisory Action received for U.S. Appl. No. 11/966,948, dated Sep. 23, 2016, 3 pages.
Advisory Action received for U.S. Appl. No. 12/184,190, dated Feb. 25, 2013, 5 pages.
Advisory Action received for U.S. Appl. No. 12/189,030, dated Nov. 8, 2013, 3 pages.
Advisory Action received for U.S. Appl. No. 12/189,030, dated Nov. 12, 2013, 3 pages.
Examiner's Answer to Appeal Brief received for U.S. Appl. No. 11/204,873, dated Mach 29, 2013, 22 pages.
Examiner's Answer to Appeal Brief received for U.S. Appl. No. 12/184,190, dated Aug. 16, 2013, 6 pages.
Examiner's Answer to Appeal Brief received for U.S. Appl. No. 12/189,030, dated May 30, 2014, 10 pages.
Final Office Action received for U.S. Appl. No. 14/535,101, dated May 18, 2018, 10 pages.
Final Office Action received for U.S. Appl. No. 14/940,010, dated Feb. 26, 2019, 12 pages.
Final Office Action received for U.S. Appl. No. 15/933,196, dated Dec. 16, 2020, 10 pages.
Final Office Action received for U.S. Appl. No. 15/933,196, dated Oct. 31, 2019, 10 pages.
Final Office Action received for U.S. Appl. No. 16/155,508, dated Oct. 11, 2019, 17 pages.
Letter Restarting Period for Response received for U.S. Appl. No. 12/189,030, dated May 26, 2011, 16 pages.
Non-Final Office Action received for U.S. Appl. No. 14/940,010, dated Oct. 12, 2018, 12 pages.
Non-Final Office Action received for U.S. Appl. No. 15/933,196, dated Jun. 18, 2021, 10 pages.
Non-Final Office Action received for U.S. Appl. No. 15/933,196, dated Mar. 1, 2019, 9 pages.
Non-Final Office Action received for U.S. Appl. No. 16/155,508, dated Mar. 14, 2019, 15 pages.
Non-Final Office Action received for U.S. Appl. No. 16/209,137, dated Jan. 25, 2019, 18 pages.
Non-Final Office Action received for U.S. Appl. No. 15/933,196, dated Apr. 6, 2020, 10 pages.
Notice of Allowance received for U.S. Appl. No. 15/727,455, dated Apr. 12, 2018, 6 pages.
Notice of Allowance received for U.S. Appl. No. 15/727,455, dated Aug. 15, 2018, 5 pages.
Notice of Allowance received for U.S. Appl. No. 15/970,571, dated Apr. 5, 2019, 10 pages.
Notice of Allowance received for U.S. Appl. No. 16/209,137, dated Jun. 14, 2019, 5 pages.
Notice of Allowance received for U.S. Appl. No. 16/209,137, dated Sep. 27, 2019, 5 pages.
Patent Board Decision received for U.S. Appl. No. 11/204,873, dated Dec. 14, 2015, 10 pages.
Patent Board Decision received for U.S. Appl. No. 12/184,190, dated Dec. 23, 2015, 5 pages.
Patent Board Decision received for U.S. Appl. No. 12/189,030, dated Jun. 2, 2016, 8 pages.

(56) References Cited

OTHER PUBLICATIONS

Restriction Requirement received for U.S. Appl. No. 10/654,108, dated Mar. 20, 2006, 6 pages.
Restriction Requirement received for U.S. Appl. No. 10/654,108, dated May 23, 2008, 7 pages.
Restriction Requirement received for U.S. Appl. No. 11/966,948, dated Aug. 17, 2010, 5 pages.
Restriction Requirement received for U.S. Appl. No. 12/184,190, dated Sep. 15, 2011, 6 pages.
Search Report received for Canadian Patent Application No. 2,600,326, dated May 5, 2021, 2 pages.
Search Report received for Chinese Patent Application No. 201810165286.7, dated Aug. 3, 2020, 6 pages (3 pages of Official copy & 3 pages of English translation).
Lee et al., "A Multi-Touch Three Dimensional Touch-Sensitive Tablet", CHI'85 Proceedings, Apr. 1985, pp. 21-25.
Mattel, "System Service and Troubleshooting Manual", Available online at: <www.dsplib.com/intv/Master>, Accessed on Dec. 11, 2002, 1 page.

\* cited by examiner

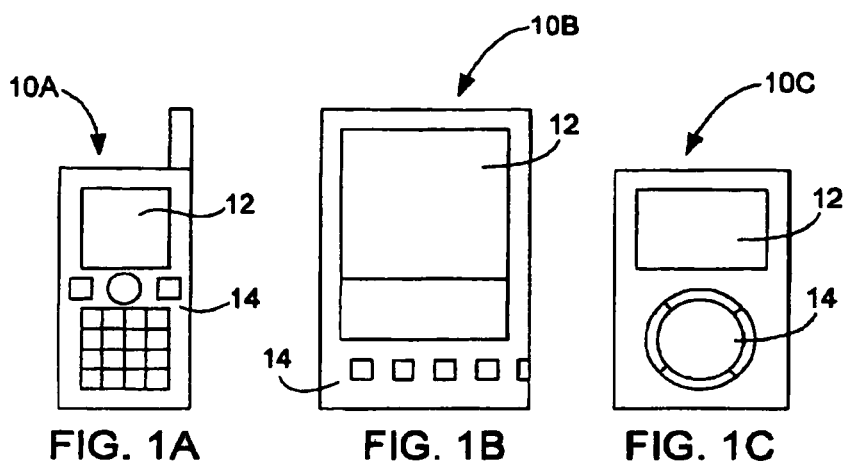
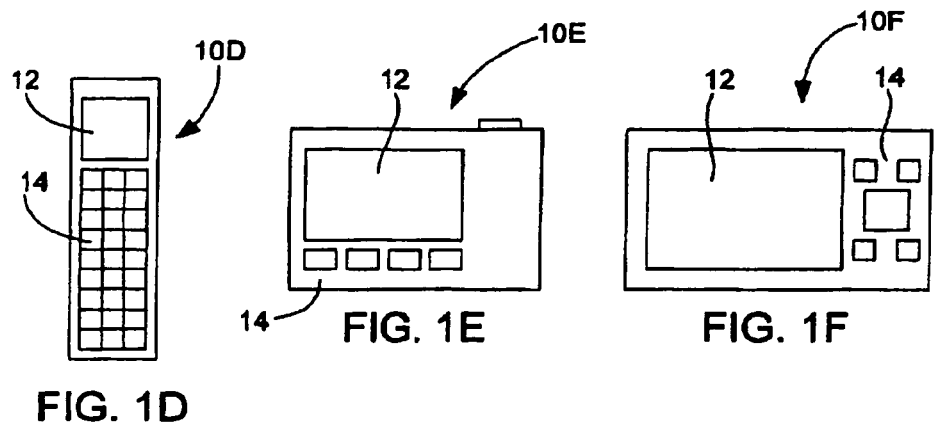

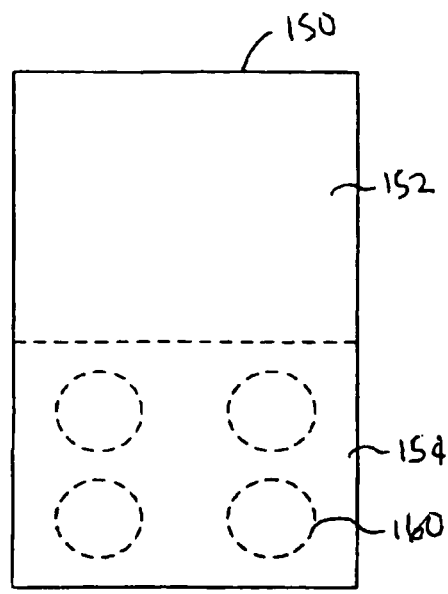
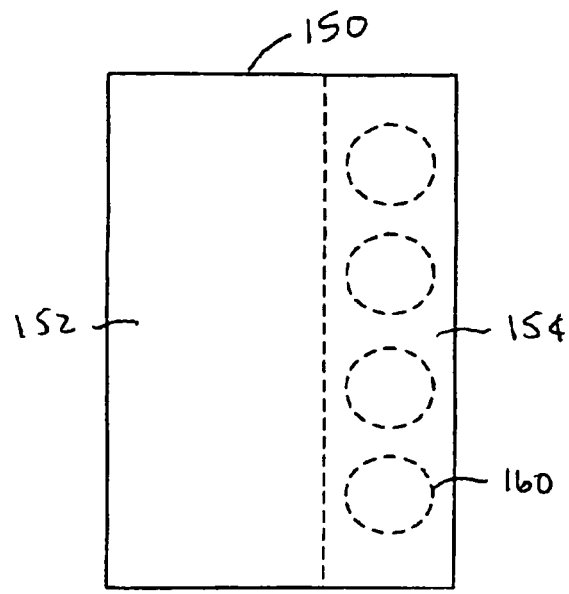
FIG. 5　　　　　FIG. 6
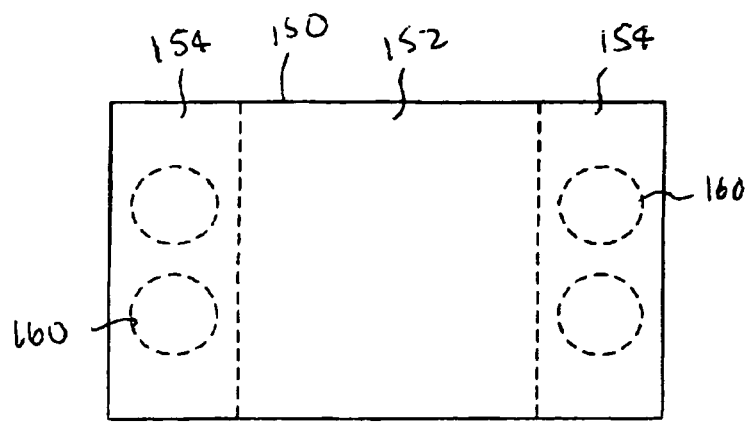
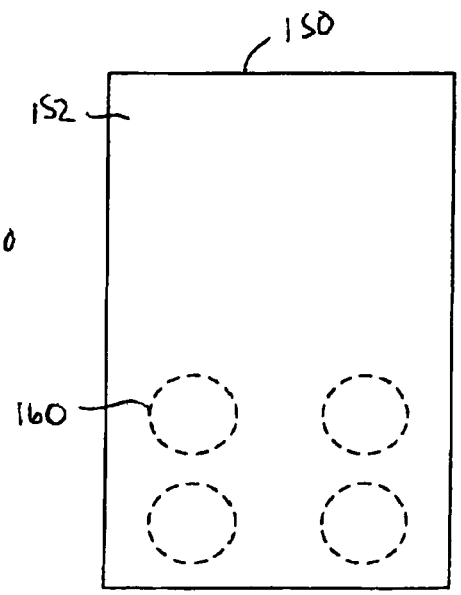
FIG. 7　　　　　FIG. 8

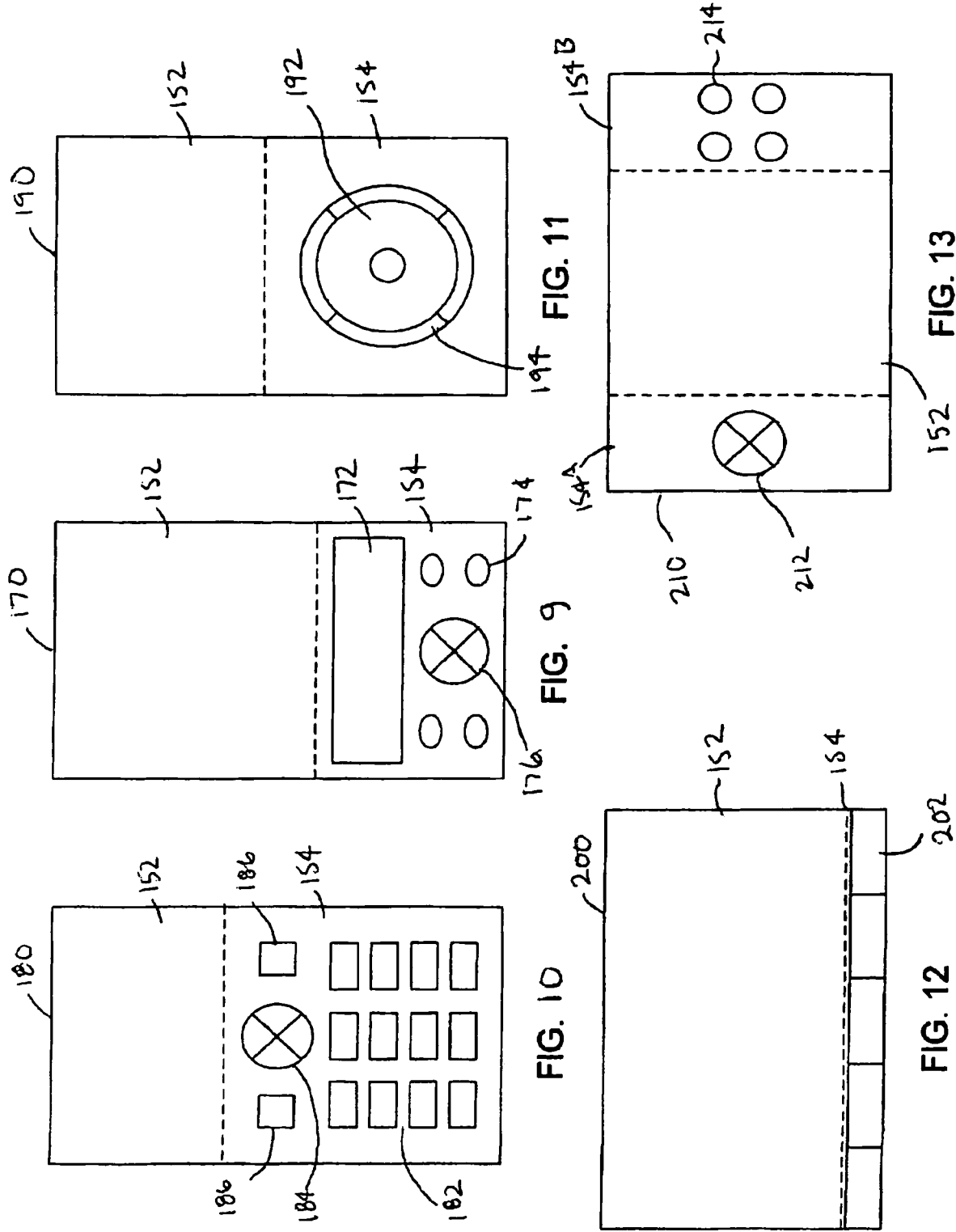

| # | UI Mode | Light Touch or Tactile Click | # Fingers used | Movement during touch or click | Duration | Touchdown location (virtual button?) | Proposed Behavior | Feedback |
|---|---|---|---|---|---|---|---|---|
| Basic list navigation | | | | | | | | |
| | List Nav. | light | 1 | none | any | anywhere | On touch-down, do nothing. On lift-off, highlight item(if any) under touch | highlight item touched |
| | List Nav. | click | 1 | NONE | short | virtual button / list item | On touch-down, do nothing. On click-down highlight item under touch (if any). On un-click, execute the item clicked | animate screen sliding RIGHT to expose new screen |
| | List Nav. | click | 1 | NONE | short | PLAY / PAUSE virtual button | On touch-down, do nothing. On click-down highlight Play/Pause icon. On un-click, PLAY/PAUSE | Change PLAY/PAUSE icon |
| | List Nav. | click | 1 | NONE | LONG | virtual button | On touch-down, do nothing. On click-down highlight item under touch (if any). After delay, bring-up context sensitive menu. | Context sensitive menu pop-up |
| | List Nav. | light or click | 1 | UP/DOWN | any | anywhere | On touch-down, do nothing. Scroll list UP/DOWN depending on UP/DOWN distance moved, use inertia & brakes, disregard LEFT/RIGHT motion during gesture. If highlighted item slides off visible screen, change highlighted item to one that is visible. | list scrolling UP/DOWN, first few letters enlarged |
| | List Nav. | light or click | 1 | LEFT | any | anywhere | On left motion, do nothing. On left motion, open highlighted folder or execute highlighted item (like legacy SELECT button) | animate screen sliding LEFT |
| | List Nav. | light or click | 1 | RIGHT | any | anywhere | On touch-down, do nothing. On right motion, go back out a folder (like legacy MENU function) | animate screen sliding RIGHT |

FIG. 27A

| # | UI Mode | Light Touch or Tactile Click | # Fingers used | Movement during touch or click | Duration | Touchdown location (virtual button?) | Proposed Behavior | Feedback |
|---|---------|------------------------------|----------------|-------------------------------|----------|--------------------------------------|-------------------|----------|
| 2D photo thumbnail preview / navigation | | | | | | | | |
| | photo preview | light | 1 | none | any | anywhere | On touch-down, do nothing. On lift-off, highlight item (if any) under touch | highlight item touched |
| | photo preview | click | 1 | NONE | short | virtual button / thumbnail | On touch-down, do nothing. On click-down highlight item under touch (if any). On un-click, execute the item clicked | animate screen sliding RIGHT to expose new screen |
| | photo preview | click | 1 | NONE | short | PLAY / PAUSE virtual button | On touch-down, do nothing. On click-down highlight Play/Pause icon. On un-click, PLAY/PAUSE | Change PLAY/PAUSE icon |
| | photo preview | click | 1 | NONE | LONG | virtual button | On touch-down, do nothing. On click-down highlight item under touch (if any). After delay, bring-up context sensitive menu. | Context sensitive menu pop-up |
| | photo preview | light or click | 1 | UP/DOWN | any | anywhere | On touch-down, do nothing. Scroll list of thumbnails UP/DOWN depending on UP/DOWN distance moved, use inertia & brakes, disregard LEFT/RIGHT motion during gesture. If highlighted item slides off visible screen, change highlighted item to one that is visible. | list of thumbnails scrolling UP/DOWN |
| | photo preview | light or click | 1 | LEFT | any | anywhere | On touch-down, do nothing. On left motion, open highlighted folder or execute highlighted item (like legacy SELECT button) | animate screen sliding LEFT |
| | photo preview | light or click | 1 | RIGHT | any | anywhere | On touch-down, do nothing. On right motion, go back out a folder (like legacy MENU function) | animate screen sliding RIGHT |

FIG. 27B

| # | UI Mode | Light Touch or Tactile Click | # Fingers used | Movement during touch or click | Duration | Touchdown location (virtual button?) | Proposed Behavior | Feedback |
|---|---|---|---|---|---|---|---|---|
| | Now Playing | | | | | | | |
| | Now Playing | light | 1 | none | any | anywhere | do nothing | n/a |
| | Now Playing | click | 1 | NONE | any | anywhere | On touch-down, do nothing. On click-down PLAY / PAUSE. | change PLAY/PAUSE icon |
| | Now Playing | light | 1 | UP/DOWN | any | anywhere | do nothing | n/a |
| | Now Playing | light | 1 | LEFT | any | anywhere | do nothing | n/a |
| | Now Playing | light | 1 | RIGHT | any | anywhere | On touch-down, do nothing. On right motion, go back out a folder (like legacy MENU function) | animate screen sliding RIGHT |
| | Now Playing | click | 1 | UP/DOWN | any | anywhere | On touch-down & click-down, do nothing. On UP/DOWN motion detect, increase/decrease volume and disregard LEFT/RIGHT motion | Volume slider moves UP/DOWN |
| | Now Playing | click | 1 | LEFT | any | anywhere | On touch-down & click-down, do nothing. On left motion, go to next track (like legacy NEXT button) | animate screen sliding LEFT |
| | Now Playing | click | 1 | RIGHT | any | anywhere | On touch-down & click-down, do nothing. On right motion detect, go to prev. track (like legacy PREV button) | animate screen sliding RIGHT |

FIG. 27C

| # | UI Mode | Light Touch or Tactile Click | # Fingers used | Movement during touch or click | Duration | Touchdown location (virtual button?) | Proposed Behavior | Feedback |
|---|---|---|---|---|---|---|---|---|
| Full-screen Item (Photo, map view, calendar day, single contact view, etc.) | | | | | | | | |
| | Full-screen item | light | 1 | none | any | anywhere | do nothing | n/a |
| | Full-screen item | click | 1 | NONE | any | anywhere | On touch-down, do nothing. On click-down PLAY / PAUSE. | change PLAY/PAUSE icon |
| | Full-screen item | light | 1 | UP/DOWN | any | anywhere | do nothing | n/a |
| | Full-screen item | light | 1 | LEFT | any | anywhere | do nothing | n/a |
| | Full-screen item | light | 1 | RIGHT | any | anywhere | On touch-down, do nothing. On right motion, go back out a folder (like legacy MENU function) | animate screen sliding RIGHT |
| | Full-screen item | click | 1 | UP/DOWN | any | anywhere | On touch-down & click-down, do nothing. On UP/DOWN motion detect, increase/decrease volume and disregard LEFT/RIGHT motion | Volume slider moves UP/DOWN |
| | Full-screen item | click | 1 | LEFT | any | anywhere | On touch-down & click-down, do nothing. On left motion, go to next item (like legacy NEXT button) | animate screen sliding LEFT |
| | Full-screen item | click | 1 | RIGHT | any | anywhere | On touch-down & click-down, do nothing. On right motion detect, go to prev. item (like legacy PREV button) | animate screen sliding RIGHT |

FIG. 27D

| # | UX Mode | Light Touch or Tactile Click | # Fingers used | Movement during touch or click | Duration | Touchdown location (virtual button?) | Proposed Behavior | Feedback |
|---|---|---|---|---|---|---|---|---|
| Optional Multi-touch gestures on full-screen item | | | | | | | | |
| | Full-screen item | light or click | 2 or more | Up, down, right, left | any | anywhere | translate image according total incremental centroid translation of contacts, scale (zoom) image according to total incremental spread (radius of gyration) of contacts, rotate imate according to incremental rotation of contacts | Image translation, scaling and rotation |

FIG. 27E

MULTI-FUNCTIONAL HAND-HELD DEVICE

CROSS-REFERENCE TO RELATED APPLICATIONS

This application is related to and claims the benefit of: (1) U.S. Provisional Patent Application No. 60/658,777, titled "Multi-Functional Hand-Held Device," filed Mar. 4, 2005 and (2) U.S. Provisional Patent Application No. 60/663,345, titled "Multi-Functional Hand-Held Device," filed Mar. 16, 2005, each of which is hereby incorporated by reference.

This application is related to the following applications, which are all herein incorporated by reference: (1) U.S. patent application Ser. No. 10/188,182, title "Touch Pad for Handheld Device," filed on Jul. 1, 2002; (2) U.S. patent application Ser. No. 10/722,948, titled "Touch Pad for Handheld Device," filed on Nov. 25, 2003; (3) U.S. patent application Ser. No. 10/643,256, titled "Movable Touch Pad with Added Functionality," filed on Aug. 18, 2003; (4) U.S. patent application Ser. No. 10/654,108, titled "Ambidextrous Mouse," filed on Sep. 2, 2003; (5) U.S. patent application Ser. No. 10/840,862, titled "Multipoint Touch Screen," filed on May 6, 2004; (6) U.S. patent application Ser. No. 10/903,964, titled "Gestures for Touch Sensitive Input Devices," filed on Jul. 30, 2004; (7) U.S. patent application Ser. No. 11/057,050, titled "Display Actuator," filed on Feb. 11, 2005, (9) U.S. patent application Ser. No. 11/115,539, titled "Hand-Held Electronic Device with Multiple Touch Sensing Devices," filed Apr. 26, 2005.

BACKGROUND

There exist today many types of hand-held electronic devices, each of which utilizes some sort of user interface. The user interface typically includes and output device in the form of a display, such as a Liquid Crystal Display (LCD), and one or more input devices, which can be mechanically actuated (e.g. switches, buttons, keys, dials, joysticks, joy pads) or electrically activated (e.g., touch pads or touch screens). The display is typically configured to present visual information such as text and graphics, and the input devices are typically configured perform operations such as issuing commands, making selections or moving a cursor or selector in the electronic device. Each of these well known devices has considerations such as size and shape limitations, costs, functionality, complexity, etc. that must be taken into account when designing the hand-held electronic device. In most cases, the user interface is positioned on the front face (or front surface) of the hand-held device for easy viewing of the display and easy manipulation of the input devices.

FIGS. 1A-1F are diagrams of various hand-held electronic devices including for example a telephone 10A (FIG. 1A), a PDA 10B (FIG. 1B), a media player 10C (FIG. 1C), a remote control 10D (FIG. 1D), a camera 10E (FIG. 1E), and a GPS module 10F (FIG. 1F). In each of these devices 10, a display 12, which is secured inside the housing of the device 10 and which can be seen through an opening in the housing, is typically positioned in a first region of the electronic device 10. Each of these devices also include one or more input devices 14, which are typically positioned in a second region of the electronic device 10 next to the display 12.

To elaborate, the telephone 10A typically includes a display 12 such as a character or graphical display, and input devices 14 such as a number pad and in some cases a navigation pad. The PDA 10B typically includes a display 12 such as a graphical display, and input devices 14 such as a stylus based resistive touch screen and buttons. The media player 10C typically includes a display 12 such as a character or graphic display and input devices 14 such as buttons or wheels. The iPod® media player manufactured by Apple Computer, Inc. of Cupertino, Calif. is one example of a media player that includes both a display and input devices disposed next to the display. The remote control 10D typically includes an input device 14 such as a keypad and may or may not have a character display 12. The camera 10E typically includes a display 12 such as a graphic display and input devices 14 such as buttons. The GPS module 10F typically includes a display 12 such as graphic display and input devices 14 such as buttons, and in some cases a joy pad.

Recently, traditionally separate hand-held electronic devices have begun to be combined in limited ways. For example, the telephone 10A has been combined with the PDA 10B. One problem that has been encountered is in the way inputs are made into the device. Each of these devices has a particular set of input mechanisms for providing inputs into the device. Some of these input mechanisms are generic to all the devices (e.g., power button) while others are not. The ones that are not generic are typically dedicated to a particular functionality of the device. By way of example, PDAs typically include four dedicated buttons while cell phones typically include a numeric keypad and at least two dedicated buttons.

Thus it is a challenge to design a merged device with limited input devices without adversely affecting the dedicated inputs for each device. As will be appreciated, it is preferable, not to overload the hand-held devices with a large number of input mechanisms as this tends to confuse the user and take up valuable space, i.e., "real estate." In the case of hand-held devices, space is at a premium because of their small size. At some point there is not enough space on the device to house all the necessary buttons and switches, etc. This is especially true when considering that all these devices need a display that typically takes up a large amount of space on its own. To increase the number of input devices beyond some level, designers would have to decrease the size of the display. However, this will often leave a negative impression on the user because the user typically desires the largest display possible. Alternatively, to accommodate more input devices designers may opt to increase the size of the device. This, too, will often leave a negative impression on a user because it would make one-handed operations difficult, and at some point, the size of the device becomes so large that it is no longer considered a hand-held device.

Therefore what is needed in the art is an improved user interface that works for multi-functional hand-held devices.

SUMMARY

Disclosed herein is a multi-functional hand-held device capable of configuring user inputs based on how the device is to be used. Preferable, the multi-functional hand-held device has at most only a few physical buttons, keys, or switches so that its display size can be substantially increased. In other words, by eliminating physical buttons, keys, or switches from a front surface of an electronic device, additional surface area becomes available for a larger display. Ultimately this strategy would allow a substantially full screen display. As used herein, a full screen display is a display that consumes, or at least dominates, a surface (e.g., front surface) of an electronic device.

Various embodiments of a multi-functional hand-held device are discussed below with reference to FIGS. 2-28. However, those skilled in the art will appreciate that the detailed description given herein with respect to these figures is exemplary and not exhaustive and that many variations on these embodiments are possible.

BRIEF DESCRIPTION OF THE DRAWINGS

The invention may best be understood by reference to the following description taken in conjunction with the accompanying drawings in which:

FIGS. 1A-1F are diagrams of various electronic devices.

FIG. 5 is a diagram of a GUI separated into a standard region and a control region.

FIG. 6 is a diagram of a GUI separated into a standard region and a control region.

FIG. 7 is a diagram of a GUI separated into a standard region and a control region.

FIG. 8 is a diagram of a GUI separated into a standard region and a control region.

FIG. 9 illustrates an exemplary a GUI for a PDA.

FIG. 10 illustrates an exemplary GUI for a cell phone.

FIG. 11 illustrates an exemplary GUI for a media player.

FIG. 12 illustrates an exemplary GUI for a video player.

FIG. 13 illustrates an exemplary GUI for a game player.

FIGS. 27A-E are tables representing one example of a touch vocabulary associated with a music player.

DETAILED DESCRIPTION

I. Multi-Functionality

Figure 2:
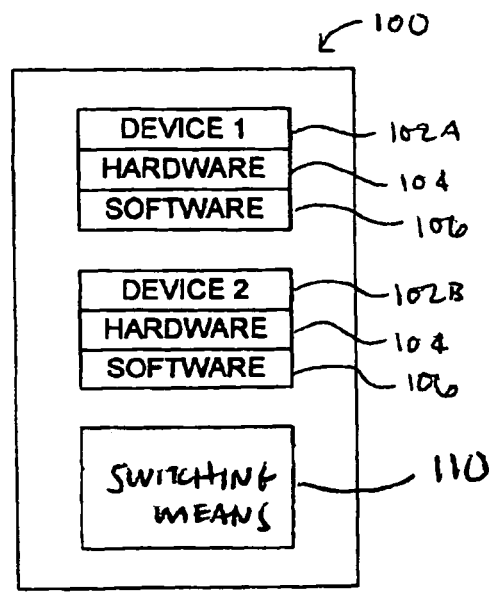
FIG. 2 is a simplified diagram of a multi-functional hand-held device.

Electronic device manufacturers have discovered the advantages of combining separate hand-held electronic devices to form multi-function devices. By having a single multi-function device, a user is not burdened with carrying, purchasing, and maintaining multiple devices. Further, the user is not limited in the operations that can be performed, i.e., the user can perform different operations with a single device that would have otherwise required the use of a different devices.

As used herein, the term "multi-functional" is used to define a device that has the capabilities of two or more traditional devices in a single device. The multi-functional device may, for example, include two or more of the following device functionalities: PDA, cell phone, music player, video player, game player, digital camera, handtop, Internet terminal, GPS or remote control. For each new device functionality that is added to a single device, the complexity and size of the device tends to increase. Therefore, with hand-held devices, there is typically a trade-off between beeping the footprint small and complexity low while still maximizing the functionality of the device.

In some cases, combing devices may result in redundant hardware components, which allows components to be used for multiple different, device functionalities. In other cases, certain hardware components are distinct to each device and therefore additional space and connectivity must be made available. Furthermore, each device functionality typically has its own programming or application software and, therefore, the multifunction device must be designed with enough memory to accommodate all the various software components.

A personal digital assistant (PDA) is a mobile hand-held device that provides computing and information storage and retrieval capabilities for personal and/or business use. PDAs are severally capable of tracking names, addresses, phone numbers and appointments. They are also often capable of taking notes, performing calculations, paging, data messaging, and electronic mail. PDAs may also include functionality for playing simple games, music, and other media files. Examples of PDAs include the Palm Pilot and Blackberry.

Like most hand-held devices, PDAs typically include a display and various input devices. The input devices may include a stylus and touch screen that work in combination with a handwriting recognition program, keypads, mini-keyboards, navigation pads, and/or soft or fixed function buttons.

Cell phones are mobile telephones that allow a user to connect to other telephones using a cellular network. Cell phones typically include a transceiver for transmitting and receiving telephone calls, controls such as a navigation pad for traversing through a display, a keypad for making numeric entries (and in some cases alphabetic entries), and soft or fixed function buttons. For example, in many cell phones one fixed function button is used for starting a call and another fixed function button is used for ending a call.

Media players come in a variety of forms. Music players are generally configured to store, process and output music. Music players can be based on the MP3 or AAC format, which is a compression system for music. Music Players typically include a microprocessor, memory, display, audio jack, data port and playback controls. The playback controls typically include features such as menu, play/pause, next, previous, volume up, and volume down. Video players are similar to music players in most respects. In some cases, they may include a data storage device for receiving a removable storage medium such as a DVD. The iPod® media player manufactured by Apple Computer, Inc. of Cupertino, Calif. is one example of a media player.

Handtops are general purpose computers similar to laptops, but in a smaller form factor. Handtops typically include a display and a full keyboard.

FIG. 2 is a simplified diagram of a multi-functional hand-held device 100. The multi-functional hand-held device 100 integrates at least two devices 102 into a single device. Each device 102 includes both hardware and software components 104 and 106, which are integrated into multi-functional hand-held device 100. It should be pointed out that the multi-functional hand-held device 100 is not limited to only two devices, and may in fact integrate any number of devices.

Multi-functional device 100 also includes switch 110, which that allows multi-functional device 100 to be switched from one device operating mode to another device operating mode. For example, switch 110 may allow a user to cycle through cell phone, media player, and PDA modes of operation. Once a particular operating mode is selected, the multi-functional device 100 operates as the selected device. For example, the programming related to the selected device is activated for use by the multi-functional hand-held device. The programming may include reconfiguring the UI based on the selected device so that the inputs made by the user correlate to the device in use. For example, the functions of any physical buttons, switches or dials as well as soft buttons, switches or dials can be reconfigured to correspond to the selected device.

However, the operating modes of multi-functional hand-held device 100 need not completely independent. In many cases, it will be desirable to allow the multiple functionalities to interact with each other. For Example, a user may look up a telephone number of a contact in the PDA and pass this number to the phone to be dialed.

II. Form Factor

The form factor of a hand-held device is generally a device that can easily be held in one hand. A typical hand-held device includes a small display in an upper portion of the front surface of the device and input controls in a lower portion of the front surface of the device. The device may additionally include controls and ports on the top, bottom, and side surfaces. Prior art hand-held devices have typically had small displays which causes some dissatisfaction for users of these devices. It is generally preferred to have larger displays so that more information can be displayed or the information being displayed can be more easily viewable (e.g., larger text). In the case of video players and game players in particular, larger displays are much preferred over smaller ones.

However, the use of large displays has been limited in the past because the required input controls often take up substantial portions of the available space. Furthermore, as device functionality converges, the number of controls on the device typically increases as each device includes its own dedicated controls. Therefore devices must be made larger or the displays must be smaller to accommodate all the new controls. Both of these outcomes are unsatisfactory. Larger devices are bulky and hard to use, and smaller screens are difficult to utilize for both relaying information and reading information from the screen.

A. One-Handed vs. Two-Handed Operation

A hand-held electronic device may be directed at one-handed operation or two-handed operation. In one-handed operation, a single hand is used to both support the device as well as to perform operations with the user interface during use. Cellular phones and media players are examples of hand-held devices are generally intended to can be operated solely with one hand. In the case of a cell phone, for example, a user may grasp the phone in one hand between the fingers and the palm and use the thumb to make entries using keys, buttons or a #joy pad.

In two-handed operation, one hand is used to support the device while the other hand performs operations with a user interface during use or, alternatively, both hands support the device as well as perform operations during use. PDA's and game players are examples of hand-held device that are typically operated with two hands. In the case of a PDA, for example, the user may grasp the device with one hand and make entries using the other hand, for example, using a stylus. In the case of a game player, the user typically grasps the device in both hands and make entries using either or both hands while holding the device.

B. Footprint/Size

Hand-held devices may have a variety different footprints or sizes. The footprint is typically associated with how the device is going to be used. Devices such as PDAs are typically used with both hands and thus they tend to be larger. Alternatively, cell phone handsets are typically used with only one hand, and thus they tend to be smaller. When integrating multiple devices, it is important task to determine the appropriate footprint of the device. For example, some believe that PDAs are too large for phone use while cell phones are too small for PDA use. Designers generally must consider the primary use of the device and gear the footprint towards that use. Although there are different footprints, there are typically minimum and maximum footprints. If the footprint is too large or too small, the device may be difficult to use.

Because of their size, the smaller devices are typically placed in a pocket while the larger devices are not. A media player is one example of a hand-held device that is sized for placement into a pocket of the user. By being pocket-sized, the user does not have to directly carry the device and therefore the device can be taken almost anywhere the user travels (e.g., the user is not limited by carrying a large, bulky and often heavy device, as in a laptop or notebook computer).

Generally it is preferred, although not necessary, that hand-held devices of the type disclosed herein have dimensions of about 5 in×3 in×1 in and perhaps about 4.1 in×2.4 in×0.75 in.

C. Full Screen Display

Because the footprint of a multifunctional hand-held device is substantially fixed by the intended primary use of the device, it becomes important for designers to determine an appropriate layout for the UI. For example, some devices may work better with a limited number of buttons and a large display while others may work better with a large number of buttons or a complete keyboard and a small display.

A preferred multi-functional hand-held device may be configured with a full screen display or a near full screen display. A full screen display consumes substantially the entire front surface of the device. The display may extend edge to edge or may fit within a small bezel of the housing at the edge of the device. The full screen display may consumes 90% or more of a front surface of a housing for a hand-held electronic device.

The full screen display may have a variety of different configurations depending on the overall footprint of the device. If the device is wide, the full screen display may have a traditional aspect ratio of about 4:3. If the device is elongated, the full screen display may have an aspect ratio that is more panoramic such as 16:9.

D. Limited Number of Mechanical Actuators

To accommodate a full screen display, the multi-functional hand-held device is preferably configured with a limited number of physical buttons. Because a limited number of physical buttons are provided, the hand-held device preferably uses a touch screen as the primary input device. Touch screens are transparent touch sensing devices that are positioned over displays. They typically work in conjunction with a GUI presented on the display. For example, the GUI may present an on-screen button, and the touch screen may detect when a user presses the on-screen button (e.g., places their finger or stylus over the on-screen button). Touch screens and GUI's are described in greater detail below.

The hand-held device may be constructed with only cross-functional physical buttons, i.e., there are no buttons dedicated to individual devices. These type of buttons may include power buttons and hold switches. In another embodiment, the hand-held device may not include any physical buttons at all. In some embodiments, the physical buttons are limited to only the sides and back surface of the hand-held device. In other embodiments, the physical buttons of the hand-held device are limited to the upper and lower portion of the sides so that there are no buttons in the regions of the sides where a user would physically support the device (i.e., holding region). In still other embodiments, the physical buttons may be located on the front surface, but only in the bezel region surrounding the display. In some embodiments, the buttons may be located on only the top and bottom surfaces of the device.

Figure 3:
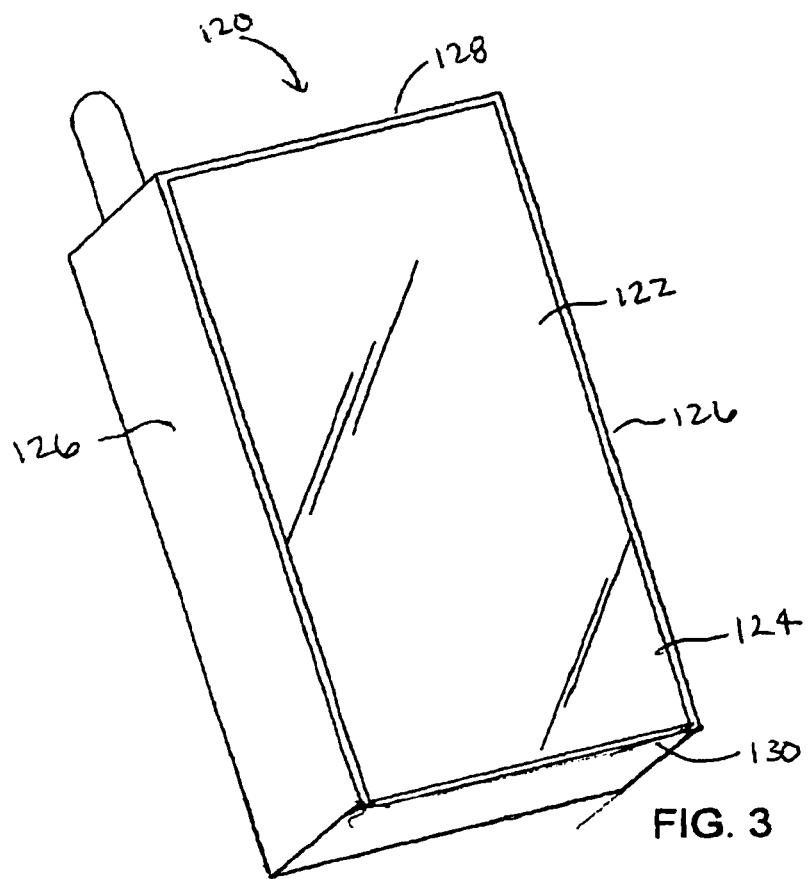
FIG. 3 is a perspective view of a substantially full screen hand-held device with a limited number of limited buttons.

FIG. 3 is a perspective view of a substantially full screen multi-functional hand-held device 120 with a limited number of buttons. There are no physical buttons on the front and side surfaces 124 and 126. The front surface is used entirely for the display 122. Further, because the sides 126 are used for grasping the device 120 it may be preferred to leave the sides free from buttons to prevent accidental actions in the event a user inadvertently presses a button while supporting the device. Although the top surface 128 and bottom surface 13 O would not typically be used to hold the device, these surfaces are not ideal locations for buttons that are often actuated because it would be awkward to reach these buttons when operating the device with one hand.

The top surface 128 may be reserved for buttons that have limited action and generic functions that are cross-functional, for example, power and hold switches. The top and bottom surfaces 128 and 130 are also well suited for placement of I/O and communication ports. The top surface 128 may, for example, include a headset/microphone jack and an antenna, and the bottom surface 130 may include power and data ports.

Figure 4:
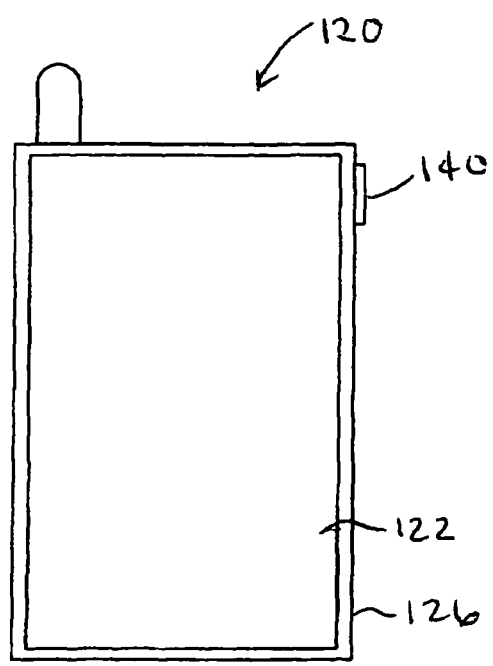
FIG. 4 is a front view of a hand-held device with at least one button.

In some cases, it may be desirable to place buttons in the upper or lower regions of the side surfaces 126 out of the way of the grasping hand. This may be particularly well suited for elongated devices that are larger than the width of the grasping hand. As shown in FIG. 4, the hand-held device 120 includes a button 140 in the upper region on the side surface 126 of the hand-held device 120. Because the button 140 is in the upper region, it tends to be out of the way of the grasping hand and therefore accidental activation is substantially eliminated. The upper button may be configured to switch the functionality of the multi-functional device i.e., button 140 may be switch 110 of FIG. 2. For example, by pressing the button 140, a new device functionality is activated, and the current device functionality is deactivated. Although the term button is used, it should be appreciated that the button 140 may correspond to a dial, wheel, switch and/or the like.

Generally it would be preferred, although not required, to limit the number of physical buttons to eight or fewer, and perhaps five or fewer.

III. Adaptablity

To limit the number of physical controls on the device (thereby maximizing the display area), the multi-functional hand-held device is preferable adaptable, i.e., the device is capable of changing its UI based on how the device is to be used. For example, if a cell phone functionality of the multi-functional device is to be used, the UI changes to accommodate the cell phone. Alternatively, if the PDA aspect of the multi-functional device is to be used, the UI changes to accommodate the PDA, etc. In essence, the multi-functional device is capable of reconfiguring its user interface based on the state or mode of the device.

Adaptability may be accomplished by reassigning the functions of the limited number of physical buttons for each device functionality. For example, a button may perform one function when a first device is activated and another when another device is activated. While this may work, it suffers from physical limitations (i.e., the number of buttons) and can be confusing to the user (who must keep track of different button meanings).

Alternatively adaptability may be accomplished by virtually incorporating the physical inputs for each functionality into the GUI in conjunction with a touch screen. This allows the GUI to adapt to whatever device is selected, and the touch screen can receive inputs corresponding to the GUI. With a GUI for each functionality, the UI for the hand-held device adapts such that the multi-function device, in effect, becomes a particular device. For example, if the cell phone functionality is selected, the GUI presents a set of virtual or soft controls that look similar to the physical controls typically used on a cell phone, such as a keypad, function buttons and possibly a navigation pad, for example.

The entire display may be used to present this information, or only a portion of the display may be used for the GUI controls. In the later case, referring to FIGS. 5-8, the GUI 150 may be separated into a standard region 152 and a control region 154. The standard region 152 represents what would normally be displayed on the display 122 when using a particular device. That is, the standard GUI screens associated with the selected device are displayed in the standard region. For example, in the case of the PDA, a main menu (window with a set of icons), calendar, address book or date book may be displayed in the standard region 152. The control region 154, on the other hand, virtually represents the physical controls that would normally be physically placed on a particular device. That is, the virtual controls that mimic the physical controls are displayed in the control region 154. For example, in the case of the PDA, the control region 154 may include virtual representations of a hand writing recognition area, a navigation pad and the standard function buttons.

The standard and control regions 152 and 154 can be positioned at any position on the display 122 (top, bottom, sides, center, etc.). For example, as shown in FIG. 5, they may be positioned vertically relative to one another (one on top of the other) or as shown in FIG. 6, they may be positioned horizontally relative to one another (side by side). These configurations can be used in either portrait or landscape modes. By way of example, in cases where the device is operated in landscape mode, the standard region 152 may be placed on one side and the control region may be placed on the opposite side. Landscape orientation may, for example, facilitate one handed operation. In some cases, the side on which the controls are displayed is based on the handedness of the user. For example, the controls may be place on the right side for right-handed users, and the controls may be placed on the left side for left-handed users. Alternatively, the controls may be placed on both sides as shown in FIG. 7. This arrangement is particularly well suited for game playing. Furthermore, the amount of area dedicated to each portion may be widely varied. For example, the screen may be divided equally and in other cases one or the other portion constitutes a greater amount of the display. In some cases, the standard region 154 is maximized to increase the normal viewing area of the display.

When a particular functionality is selected for use, the hand-held device loads the software for the selected functionality and configures the GUI 150 including the standard region 152 and the control region 154. The controls in the control region 154 can therefore be used to control whatever is being shown in the standard region 152. In some cases, the control region 154 may even change in accordance with the needs of each displayed window for the particular device.

Alternatively, as shown in FIG. 8, virtual controls 160 may be overlaid on top of the standard region 152 so that the standard region 152 can fully utilize the entire display 122. In fact, the virtual controls 160 may appear and disappear as needed. For example, the user may touch the screen and this may drive the device to display the controls over a portion of the display including whatever is already displayed. Examples of virtual controls that operate in this manner can be found in U.S. patent application Ser. No. 11/038,590, titled "Mode-Based Graphical User Interfaces for Touch Sensitive Input Devices," filed on Jan. 18, 2005.

A. GUI Based on Functionality

FIGS. 9-17 illustrate various examples of GUIs for different states or modes of the multi-functional device.

FIG. 9 is a diagram of a GUI 170 that is used in a PDA mode. As shown, the GUI is divided into a standard region 152 and a control region 154. Located inside the control region 154 are a virtual handwriting pad 172, four virtual buttons 174 and a virtual navigation pad 176.

FIG. 10 is a diagram of a GUI 180 that is used in a cell phone mode. As shown, the GUI 180 is divided into a standard region 152 and a control region 154. Located inside the control region 154 are a virtual keypad 182, a virtual navigation pad 184 and two virtual buttons 186.

FIG. 11 is a diagram of a GUI 190 that is used in a music player mode. As shown, the GUI 190 is divided into a standard region 152 and a control region 154. Located inside the control region 154 are a virtual scroll wheel 192 and five virtual buttons 194. Additional details on a virtual scroll wheel are provided in U.S. patent application Ser. No. 11/038,590, titled "Mode-Based Graphical User Interfaces for Touch Sensitive Input Devices," filed on Jan. 18, 2005.

FIG. 12 is a diagram of a GUI 200 that is used in a video player mode. As shown, the GUI 200 is divided into a standard region 152 and a control region 154. Located inside the control region 154 are a plurality of virtual buttons 202. Alternatively, the controls may appears and disappears as needed since the video player is primarily used in conjunction with a full screen viewing mode.

FIG. 13 is a diagram of a GUI 210 that is used in a game player mode. As shown, the GUI 210 is divided into a standard region 152 and two control regions 154A and 154B on the sides of the standard region 152. The left side control region 154A includes a navigation or directional pad 212, and the right side control region includes four virtual buttons 214 (or vice versa depending on the users particular needs, left or right handed).

Figure 14:
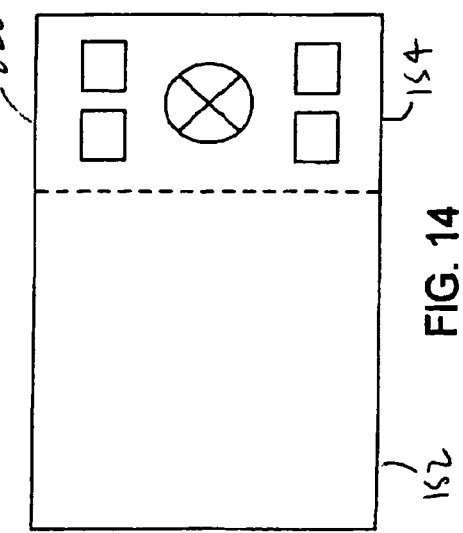
FIG. 14 illustrates an exemplary GUI for a camera.

FIG. 14 is a diagram of a GUI 220 that is used in a camera mode. As shown, the GUI 220 is divided into a standard region 152 and a control region 154. The standard region 152 may represent the view finder. Located inside the control region 154 are various buttons 222 including for example picture click, zoom, flash, etc. A navigation pad 224 may also be included so that the pictures can be scrolled through or for menu navigation.

Figure 15:
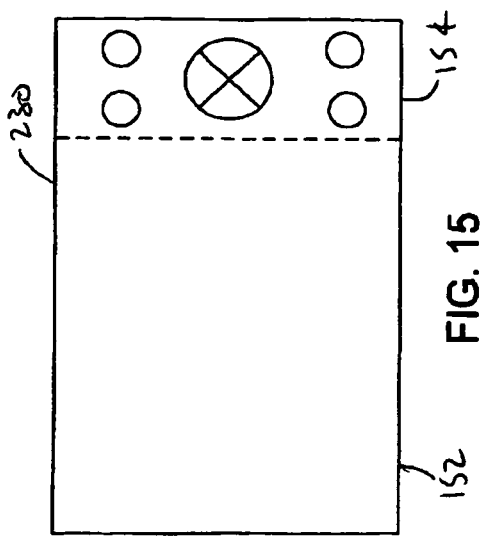
FIG. 15 illustrates an exemplary GUI for a GPS.

FIG. 15 is a diagram of a GUI 230 that is used in a GPS receiver mode. As shown, the GUI 230 is divided into a standard region 152 and a control region 154. Located inside the control region 154 are various buttons 222 including for example zoom, pan, etc. A navigation pad 224 may also be included.

Figure 16:
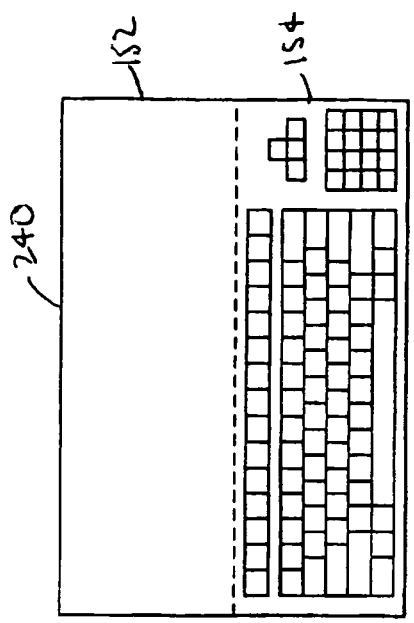
FIG. 16 illustrates an exemplary GUI for a remote control.

FIG. 16 is a diagram of a GUI 240 that is used in a hand top mode. As shown, the GUI 240 is divided into a standard region 152 and a control region 154. Located inside the control region 154 is a virtual keyboard 242.

Figure 17:
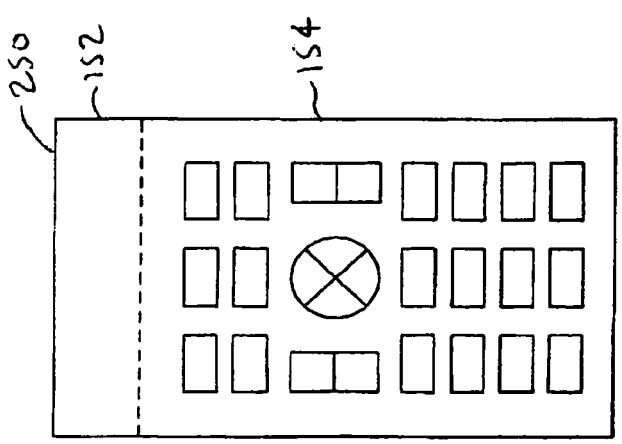
FIG. 17 illustrates an exemplary GUI for a hand top.

FIG. 17 is a diagram of a GUI 250 that is used in a remote control mode. As shown, the GUI 250 is divided into a standard region 152 and a control region 154. Located inside the control region 154 are various keys and buttons 252 associated with controlling a remote device such as a TV, DVD player, A/V amplifier, VHS, CD player, etc.

B. Switching Between Devices (GUI)

Before a particular device functionality can be used, it typically must be selected for use. The selection can come in a variety of forms. For example, the selection may be made via a main menu that includes soft buttons or icons that, when selected, activate the device functionality associated with the soft button. During activation, the GUI for that particular device is brought into view on the display (see FIGS. 9-17) and the software associated with the device is installed, loaded or activated. From that point on, the multi-functional device operates like the selected device.

Figure 18:
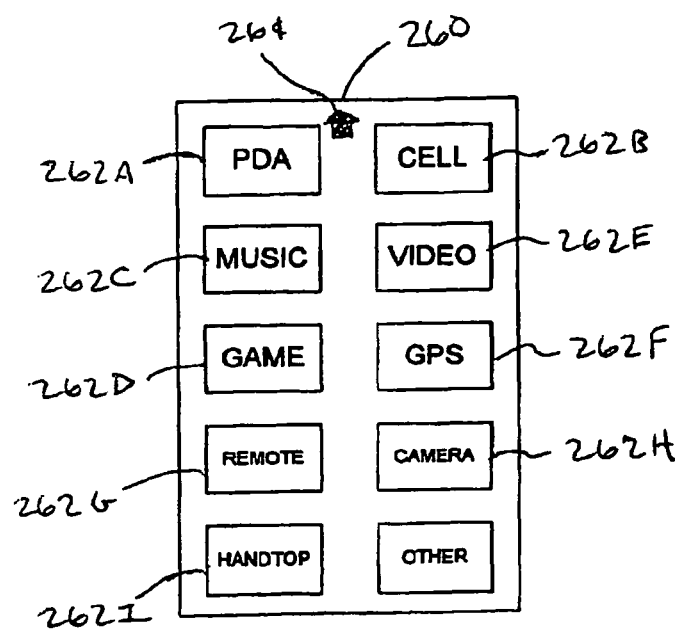
FIG. 18 illustrates an exemplary GUI for a main menu of a multi-functional hand held device.

FIG. 18 illustrated an exemplary main menu GUI 260 of a multi-functional device. As shown, the GUI 260 includes icons/buttons 262 for launching each of the various device functionalities. In this particular example, the main menu page 260 includes a PDA button 262A, a cell phone button 262B, a music player button 262C, a game player button 262D, a video player button 262E, a GPS button 262F, a remote control button 262G, a camera button 262H and a handtop button 262I. The various buttons 262 are virtual buttons. When a button is pressed, the main page for the selected functionally (e.g., as shown in FIGS. 9-17) is brought into view on the display. To select another device, the user simply selects a soft home button 264 located in the GUI of each device to return to the main menu page 260, and thereafter selects the desired functionality in the main menu page 260.

The selection of alternative functionalities may also be accomplished by flipping (or scrolling) through the various GUIs until the desired GUI is found. For example, the different GUIs may be incrementally brought into view page after page (or frame after frame) when a next (flip) command signal is generated (e.g., slide show effect). The transition between pages may be widely varied. The transition may be from side to side, top to bottom or center to center. The transition may also include fading in and out, popping in and out, or enlarging and reducing. The command signal may be generated by a physical or virtual button or wheel. Using a button, each press may cause a new page to be displayed. Using a wheel, a predetermined amount of rotation may cause a new page to be displayed.

The command signal may also be generated in a variety of other ways. For example, the command signal may also be generated by gestures initiated on the touch screen. For example, sliding a finger (or stylus) across the display may cause a new page to be displayed. If slid to the right, the next page may be displayed. If slid to the left, the previous page may be displayed. The command signal may also be generated by 3D device gestures created when the entire handheld device is moved spatially. By way of example, shaking the device may cause a new page to be displayed.

The command signal may also be generated by forces that are applied to the device. By way of example, squeezing the device may cause a new page to be displayed. The command signal may also be generated by sensing the orientation of the device either relative to the ground, as sensed by accelerometers, or relative to a compass direction indicated by an internal compass. For example, if the device is at 0 degrees, a first page is displayed, at 90 degrees a second page is displayed, at 180 degrees a third page is displayed and at 270 degrees a fourth page is displayed.

The command signal may also be generated by monitoring a user's voice (i.e., voice recognition). If the user calls out "PHONE," the page associated with the phone is displayed, if the user calls out "PDA," the page associated with the PDA is displayed.

The command signal may also be generated by monitoring incoming signals from other systems (whether transmitted wirelessly or via a cable). For example, if a call is received, the device may automatically configure the system as a phone. Alternatively, it may only present a control panel for taking or passing on the call.

As an alternative to integrating functionalities, the device may be configured to keep the various modes separate. That is, the device does not merge the functionality together (integrated layers and GUIs), but instead keeps them distinct from one another. In some cases, by keeping different functionalities distinct, user confusion may be reduced.

C. Operating at Least Two Functionalities Simultaneously

Preferably, the user may be able to activate two or more device functionalities simultaneously. In such a case, the software for the multiple functionalities is activated simultaneously and the display operates in a split screen mode where the screen is parsed into different sections, each section including a particular device GUI. Generally this would require the GUI for each functionality to fit on the screen. The multi-function mode may be selected in a variety of ways. In one implementation, when the user simultaneously touches two or more device icons, the device activates the multiple device functionalities and brings the appropriate GUIs into view on the screen.

D. Configurable GUI (User Preferences)

The GUI control panels for each device functionality may be configurable by the user. For example, the user may design or customize his own UI for each device, and assign functions to the various elements of the UI. The functions may include initiating commands, selecting an item, opening a file or document, launching a program, executing instructions, viewing a menu on the display screen, etc. The parameters configurable by the user may include selecting the number and type of GUI elements (buttons) as well as the location of the GUI elements on the page. In some cases, the system may include a design palette that allows a user to review and/or customize the UI layout, i.e., the user may quickly and conveniently review preconfigured or default layout and make changes thereto. Once changed, the modified layout will be automatically saved and thereby employed to handle future events.

IV. Input Devices

There are a number of problems with current input devices for hand-held computers. For example, there is no realistic way to fit all the dedicated physical buttons that are needed for each device because more and more buttons must be fit into a small space. A related problem arises in that as more physical buttons are incorporated into the device, the buttons must get closer together thereby challenging the dexterity of the user. Furthermore, because physical buttons stick out they are often accidentally activated during normal use or while the device is transported e.g., in a user's pocket. Finally, large numbers of small physical buttons can be confusing to the user as well as aesthetically unpleasing.

To overcome these and other problems a variety of alternative inputs arrangements are proposed (in addition to or in place of physical buttons, switches, etc.). The basic idea is to reduce the number of physical and mechanical input mechanisms (and therefore the amount of dedicated space needed on the surface of the device) and/or eliminate the physical and mechanical input mechanisms altogether. By reducing or eliminating the physical input devices, the display of the electronic device can be maximized, or alternatively the size of the electronic device can be minimized. Furthermore, such a device is more aesthetically pleasing. In some cases, the hand-held device can be configured so that it appears to only have a display and no dedicated physical input devices.

The alternative input means may also be hidden from view such that they are not visible to the user. As a result, the hand-held electronic device may appear to only have a display with no visible buttons, switches, etc. Such a device is more aesthetically pleasing (e.g., may comprise smooth surfaces with no breaks gaps or lines), and, in many cases, can be made smaller without sacrificing screen size and input functionality.

A. Touch Screen

One particularly suitable input arrangement is a touch screen. A touch screen in conjunction with GUI may be configured as the primary input arrangement for a hand-held device. A touch screen is basically a transparent input panel positioned in front of the display. A touch screen generates input signals when an object such as a finger or stylus touches or is moved across the surface of the touch screen. In most cases, touch screens allow a user to make selections and initiate movements in a GUI by simply touching the display screen via a finger. For example, a user may make a selection by pointing directly to a graphical object displayed on the display screen. Corresponding to an on-screen button for performing specific actions in the hand-held electronic device. In general, the touch screen recognizes the touch and position of the touch on the display and a controller of the hand-held electronic device interprets the touch and thereafter performs an action based on the touch event. There are several types of touch screen technologies including resistive, capacitive, infrared and surface acoustic wave.

A preferred touch screen for a multi-functional hand-held computer is a multipoint capacitive touch screen. Such a touch screen comprises several independent and spatially distinct sensing points, nodes, or regions that are positioned throughout the touch screen. The sensing points are dispersed about the touch screen with each sensing point representing a different position on the surface of the touch screen. The sensing points may be positioned in a grid or a pixel array where each sensing point is capable of generating a signal. A signal is produced each time an object is positioned over a sensing point. When an object is placed over multiple sensing points or when the object is moved between or over multiple sensing point, multiple signals can be generated. The sensing points generally map the touch screen plane into a coordinate system such as a Cartesian coordinate system or polar coordinate system. One example of such a touch screen is disclosed in U.S. patent application Ser. No. 10/840,862, titled "Multipoint Touch Screen" filed on May 6, 2004.

B. Touch Sensitive Housing

A hand-held electronic device may also incorporate one or more include a touch sensitive surfaces of the device housing itself that provide either a larger surface for tracking touch inputs or smaller dedicated areas such as touch buttons for performing dedicated functions. Such surfaces may be located on any surface of the housing, any side of the housing, any portion of any side of the housing or at dedicated locations on the surface of the housing. For example, the touch regions may be located on the sides or back surface of the housing, and may even be located at the bezel located at the front surface of the housing. In all of these cases, a large portion of the front surface of the housing is saved for the display so that the viewing area of the hand-held electronic device can be maximized. The touch sensitive surfaces of the housing may take the form of one or more touch panels that are positioned within the housing. The touch sensitive surface may be alternatively or additionally be provided directly by the housing. That is, the touch sensing components may be integrated or incorporated into or disposed underneath the housing such that the housing itself is the touch sensing device (rather than using a separate touch panel). Similarly to a touch screen, a touch sensitive housing recognizes the touch and position of a touch on the surface and a controller of the hand-held electronic device interprets the touch and thereafter performs an action based on the touch event. Touch surfaces are constructed in basically the same manner as a touch screen, except the surfaces need not be substantially transparent.

By way of example, the touch sensitive housing may generally correspond to the touch sensitive housing described in greater detail U.S. patent application Ser. No. 11/115,539, titled "Hand-Held Electronic Device with Multiple Touch Sensing Devices," filed Apr. 26, 2005.

C. Display Actuator

A hand-held multi-functional electronic device may also include a display actuator, which is an input device that mechanically uses the display of the hand-held device to provide inputs into the device (rather than electrically as with a touch screen). The display actuator may be used separately or in combination with the touch screen. The display actuator may include a movable display that causes one or more input signals to be generated when moved. The input signals then can be used to initiate commands, make selections, or control motion in a display.

The movable display may be configured to translate, slide, pivot, and/or rotate relative to the frame. The display is typically movable relative to a frame or housing that movably supports the display in its various positions. In some cases, the display is movably coupled to the frame, and in other cases the frame movably restrains a floating display.

The input signals may be generated by movement indicator(s) that monitor the movements of the display and produces signals indicative of such movements. The detection mechanism may, for example, one or more switches, sensors, encoders, and/or the like. Any suitable mechanical, electrical and/or optical switch, sensor or encoder may be used. For example, tact switches, force sensitive resistors, pressure sensors, proximity sensors, infrared sensors, mechanical or optical encoders and/or the like may be used. The movement indicators may be placed underneath the display or at the sides of the display as appropriate. Alternatively or additionally, these movement indicators may be attached to the display or some component of the display.

An exemplary display actuator is disclosed in U.S. patent application Ser. No. 11/057,050, titled "Display Actuator," filed on Feb. 11, 2005.

D. Pressure or Force Sensing Devices

The multi-functional hand-held electronic device described above may further include force or pressure sensing devices such as a force sensing display or housing.

1. Force Sensitive Display

A force sensitive display causes one or more input signals to be generated when pressure is exerted on the display screen of the device. The input signals can be used to initiate commands, make selections, or control motion in a display. Such displays generally provide a slight amount of flex (unnoticeable to the user) so, that any forces exerted thereon can be measured by a force detection arrangement generally provided underneath the display. The force detection arrangement monitors the forces exerted on the display and produces signals indicative thereof. The force detection arrangement may include one or more force sensors such as force sensitive resistors, force sensitive capacitors, load cells, pressure plates, piezoelectric transducers, strain gauges, etc. The force sensors may be attached to the back of the display or to a structural platform located within the housing of the device. When a force is applied to the display, it is transmitted through the display to the force sensor located underneath the display.

Figure 19:
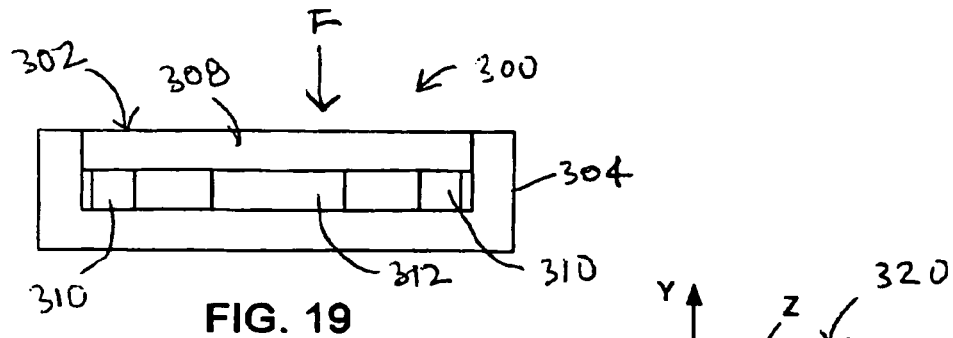
FIG. 19 is a side elevation view, in cross section, of a hand-held device incorporating a force sensitive display.

FIG. 19 is a side elevation view, in cross section, of a hand-held device 300 incorporating a force sensitive display 302. The force sensitive display 302 includes a display 308 and one or more force sensors 310 disposed underneath the display 308 (between the display and a structural platform 306). In most cases, the force sensitive display 302 includes a plurality of sensors 310 that are laid out in an array. For example, the sensors 310 may be positioned side by side in rows and columns. The force sensors 310 measure the amount of force being applied to the display and when a desired force threshold is reached a control signal is generated. In some cases, an elastomer 312 is placed between the display and the structural platform to help transmit the force being exerted on the surface of the display to the force sensors disposed below the display.

Force sensing may be provided in conjunction with a touch screen to differentiate between light and hard touches. The determination of whether a touch is a light touch or a hard touch may be made by monitoring the force with the force sensors and comparing the force to a predetermined threshold. When the force threshold is not exceeded, the touch is considered a light touch. When the force threshold is exceeded, the touch is considered a hard touch. Each type of touch may be used to control different aspects of the device. Light touches may be associated with passive events such as navigation (e.g., cursor control scrolling, panning, zoom, rotation, etc.) and hard touches may be associated with active events such as selections or commands (e.g., button click).

Figure 20:
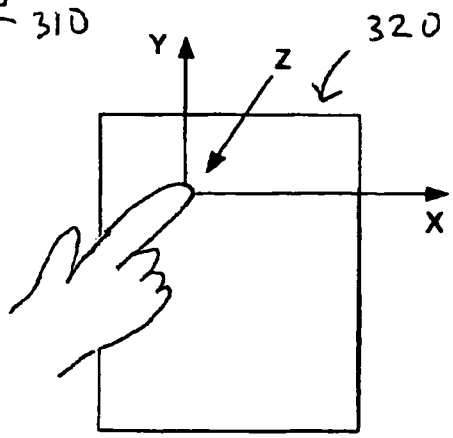
FIG. 20 illustrates an input device that combines touch sensing and force sensing devices to provide x, y and z components when touched.

FIG. 20 illustrates an input device 320 that combines touch sensing and force sensing devices to provide x, y and z components when touched. The touch sensing device provides position sensing in the x and y directions, and the force sensing device provides force sensing in the z direction. These devices cooperate to output x, y location and z pressure information whenever there is a touch on the touch surface.

Figure 21:
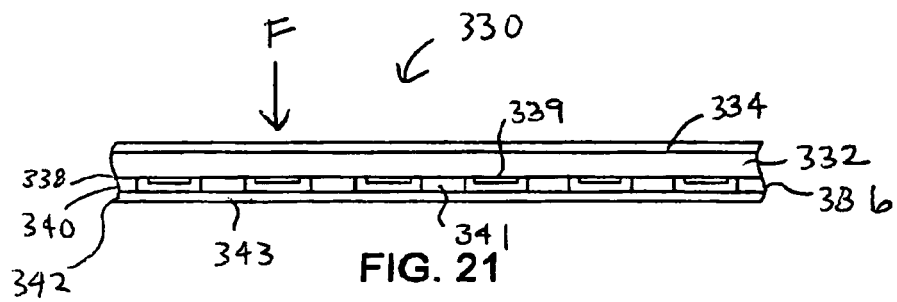
FIG. 21 is a side elevation view of an I/O device that combines a display with touch screen and a force sensing mechanism.

FIG. 21 is a side elevation view of an I/O device 330 that combines a display 332 with touch screen 334 and a force sensing mechanism 336. The touch screen 334 provides high resolution touch locations, and the force sensing mechanism 336 provides a measure of where the force is coming from as well the total force. Touch screen 334 is disposed over the display 332, and the force sensing mechanism 336 is disposed below the display 332 although other arrangements are possible.

Force sensing mechanism 336 may also be widely varied. In the illustrated embodiment, the force sensing mechanism 336 is based on capacitance, and more particularly, self capacitance. The illustrated force sensing mechanism 336 is formed from various layers including an electrode layer 338, an elastomer layer 340 and a conductive layer 342.

Electrode layer 338 includes a plurality of spatially separated electrodes 339 that are positioned across the bottom of the display 332. Electrodes 339 are typically positioned in an array of rows and columns although often configuring are possible. Any number of electrodes may be used.

Elastomer layer 340 includes one or more elastic members 341 positioned between the electrode layer 338 and the conductive layer 342. Elastic members 341 allow the display 332 to move inwardly with a limited amount of displacement. In one implementation, elastic members 441 are silicone patches with a thickness of about 0.2 mm.

Conductive layer 342 typically takes the form of a grounded metal plate 343. A capacitive circuit is formed between each of the electrodes 339 and the grounded metal plate 343. When a user pushes down on the display 332, the force being exerted thereon causes the display 332 to displace inwardly against the elastic members 341 compressing the elastic members. This causes a change in the capacitance between the electrodes 339 and the metal plate 343. This change in capacitance is sensed by a control circuit operatively coupled to each of the electrodes 339. Capacitance sensing circuits are disclosed in the various incorporated references.

Figure 22:
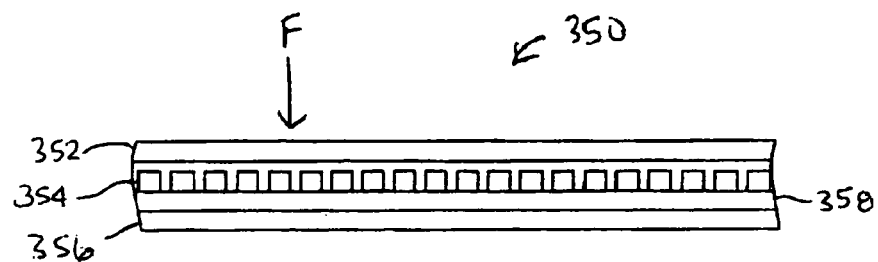
FIG. 22 is a side elevation view of an input device.

FIG. 22 is a side elevation view of an input device 350 that may be positioned over a display. The input device 350 combines touch sensing and force sensing into a single device. In this embodiment, both the touch sensing and force sensing is provided by mutual capacitance. As shown, the input device 350 is formed from various layers including a top drive layer 352, a middle sense layer 354, and a bottom drive layer 356. Furthermore, the middle sense layer 354 is positioned on an elastomer layer 358 disposed between the middle sense layer 354 and the bottom drive layer 356. The top and bottom drive layers 353 and 356 include a plurality of spatially separated lines in rows and the middle sense layer 354 includes a plurality of spatially separated lines in columns. The top and middle layers 352 and 354 therefore form a grid, and the bottom and middle layers 356 and 354 form a grid.

During operation, the lines on the top layer 352 are scanned, and thereafter the lines on the bottom layer 356 are scanned (or vice versa). When there is a touch, the mutual capacitance measured between the top drive layer 352 and the middle sense layer 354 provide the x and y location of the touch. In addition, the mutual capacitance measured between the bottom drive layer 356 and the middle sense layer 354 provide the amount of force of the touch. This particular arrangement provides a full image of force superimposed on a full image of touch. The input device including the touch layers and the force layers may be operated similarly to the methods described in U.S. patent application Ser. No. 10/840,862, titled "Multipoint Touch Screen," filed on May 6, 2004.

2. Force Sensitive Housing

The hand-held device may also include a force sensitive housing. The force sensitive housing provides inputs when forces are applied to the housing of the hand-held device. A force sensitive housing is similar to a force sensitive screen in that. The housing provides a slight amount of flex (possibly unnoticeable to the user) so that any forces exerted thereon can be distributed to a force detection arrangement located within the housing. The force detection arrangement monitors the forces on the housing and produces signals indicative thereof. As with the force sensitive display discussed above, the force detection mechanism may include one or more force sensors disposed with in the housing such as force sensitive resistors, force sensitive capacitors, load cells, pressure plates, piezoelectric transducers, strain gauges and/or the like. When a force is applied to the housing (squeezing or pushing on the housing), it is transmitted through the housing to the force sensor located within the housing.

The force sensitive portions of the housing may be located on any surface of the housing, any side of the housing, any portion of any side of the housing or at dedicated locations on the surface of the housing. The sides of the housing are ideal places for implementing a squeeze feature. This is because the users fingers are typically positioned on one side of the device and thumb on the other and therefore the hand may easily squeeze the sides via a pinching action. Because it is so convenient to activate the squeeze feature, special care must be taken when designing the squeeze feature so that it will not be accidentally activate during normal use. Thus the device needs to be able to differentiate between light and hard squeezes. If the squeeze feature is implemented using force sensitive resistors (FSRs) which exhibit, a decrease in resistance with an increase in force applied to the active surface a comparator circuit can be used to output a signal to indicate activation when a preset force threshold is reached.

Figure 23:
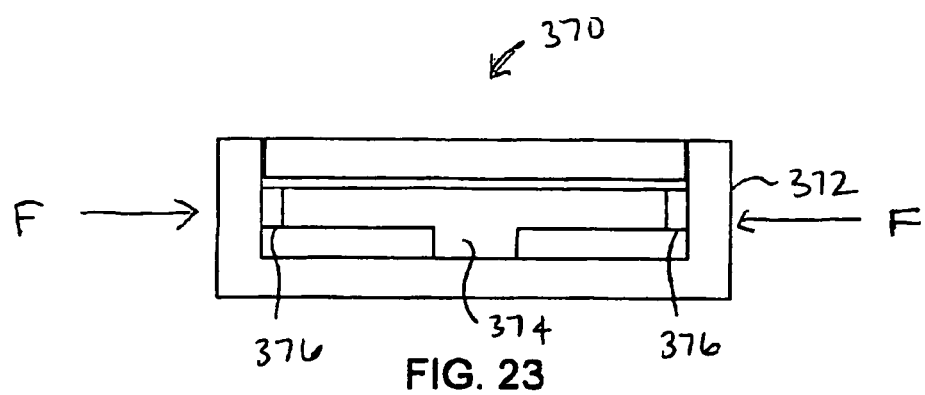
FIG. 23 is a side view, in cross section, of a hand-held device that incorporates a squeeze feature.

FIG. 23 is a side view, in cross section, of a hand-held device 370 that incorporates a squeeze feature. As shown, the device 370 includes a housing 372 and a support platform 374 inside the housing 372. Between the support platform 374 and the inner surface of the housing 372 are a pair of force sensors 376. When a force is applied to the housing 372 as for example by the pinching nature of the hand, the housing 372 flexes inwardly under the pressure. This causes the force sensors 376 to be sandwiched between the housing 372 and the support platform 374. The force sensors 376 measure the amount of force being exerted and when a desired force threshold is reached, the force sensors 376 generate a control signal. For example, as a result of being sandwiched, a force resistive sensor may exhibit a reduced resistance and when a desired threshold is reached, a control signal is generated.

The force sensitive housing may be is provided in conjunction with a touch sensitive housing as discussed above.

E. Motion Actuated Input Device

The hand-held electronic device may also include a motion actuated input device. The motion actuated input device provides inputs when the hand-held device is in motion or is placed in a certain orientation. A motion actuated input device typically includes a motion sensor, such as an accelerometer, that monitors the motion of the device along the x, y, and/or z axis and produces signals indicative thereof. The motion sensor may, for example, include an accelerometer. Alternatively, the motion sensor could be an orientation sensor, such as an electronic compass, that allows the device to determine its orientation in a generally horizontal plane. The motion sensors may be attached to the housing or to some other structural component located within the housing of the device. When motion is applied to the device (gesturing, shaking, hand waving, etc.), it is transmitted through the housing to the motion sensor.

Because motion sensors typically measure all motion, not just intended motion, the intended motion information typically must be separated from the other motion information to produce an accurate command signal. For example, large scale movements such as shaking the device will produce primarily low frequency information. Conversely, small scale movements, such as vibrations, primarily produce high frequency information. The high frequency information can be filtered out thereby leaving only low frequency information indicative of the large scale movements (e.g., shaking). The filtered information can then be converted into a control signal.

Figure 24:
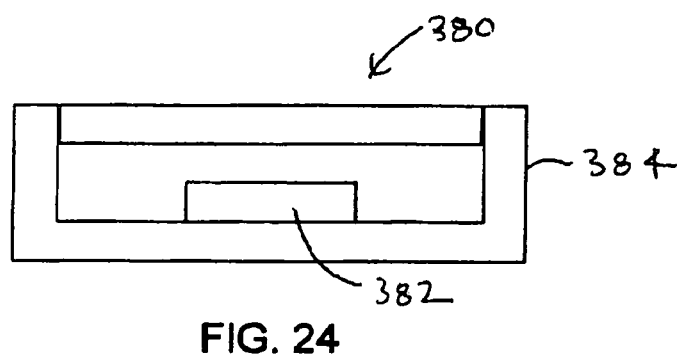
FIG. 24 is a side view, in cross section, of a hand-held electronic device.

FIG. 24 is a side view, in cross section, of a hand-held electronic device 380. The hand-held device 380 includes an accelerometer 382 that is attached to a housing 384 of the hand-held device 380. When the device 380 is moved about by the user, the accelerometer 382 recognizes the motion and a controller of the hand-held electronic device 380 interprets the motion and thereafter performs an action based on the motion event.

F. Mechanical Actuators

While one would like to eliminate all surface mounted actuators such as buttons and wheels, it is sometimes impractical. Therefore the hand-held device may include some number of surface mounted actuators. Preferably, these actuators are generic to each of the integrated devices. That is, their meaning is the same regardless of what device functionality is activated. It is also preferred that the surface mounted actuators be placed on surfaces other than the front surface, which houses the viewing region of the display, although this is not required.

One particularly useful mechanical actuator is a hold switch. The hold switch may be configured to activate and deactivate the primary input means, e.g., the touch screen. This permits a user to prevent unwanted entries, for example, when the device is stored inside a user's pocket. In one implementation, the hold switch may be placed on the top surface out of the way of the grasping hand, but in a position for easy access (as opposed to the bottom surface). The hold switch can not only deactivate the touch screen but also mechanical actuators and other input and other input devices.

Another particularly useful mechanical actuator is a power switch. When the power switch is turned on, the device is powered up and ready to go. When the power switch is turned off, the device is shut down. In one implementation, the power switch may be placed on the top surface out of the way of the grasping hand, but in a position for easy access (as opposed to the bottom surface).

Another useful mechanical actuator is a navigation pad. The navigation pad is typically included with many hand-held devices. The functionality of the navigation pad may be changed according to the current operating mode of the device. In the case of a music player, for example, the directional keys may be assigned, play/pause, next, previous, and volume up and down. Other assignable buttons may also be included on the device.

Still another useful mechanical actuator is a switching actuator. The switching actuator may be configured to change the functionality of the device, i.e., by activating the switching actuator the functionality or state of the device switches from one mode to another. The switching actuator may be widely varied.

For example, the switching actuator may be a dial or wheel. By incrementally rotating the wheel, the device is incrementally switched from one device to the other (generally in some predetermined order). A full rotation of each device generally cycles through the entire group of integrated devices. The wheel or dial may for example operate like a scroll wheel. Although the placement may be widely varied, the switching wheel may be placed in the upper region of the sides of the device. By placing the wheel here, a users thumb may be used to easily rotate the wheel. For example, the users thumb may be extended from the grasping action so that the wheel can be rotated.

Alternatively, the switching actuator may be a button. By repetitively pressing on the button, the device is switched from one device to another (generally in some predetermined order). Although the placement may be widely varied, the switching button may be placed in the upper region of the sides of the device. By placing the button here, a users thumb or index finger may be used to easily press the button.

The hand-held device may also include any commercially available touch pad. Several examples of touch pads may be found in U.S. patent application Ser. No. 10/188,182, titled "Touch Pad for Handheld Device," filed on Jul. 1, 2002, U.S. patent application Ser. No. 10/722,948, titled "Touch Pad for Handheld Device," filed on Nov. 25, 2003, and U.S. patent application Ser. No. 10/643,256, titled "Movable Touch Pad with Added Functionality," filed on Aug. 18, 2003.

In another embodiment, the hand-held device may include a scroll wheel. Scroll wheels can be used in each functionality to scroll through a window.

G. Microphone

The hand-held device may also include a microphone that picks-up audio sounds. The microphone may be used in conjunction with a cell phone to transmit sounds, such as the user's voice. The microphone may also be used to record sounds or enter voice commands into the hand-held device. For example, using voice recognition software, the hand-held device may be able to recognize voice commands and generated control signals associated therewith. The microphone may be placed in the bottom surface of the hand-held device or possible in the front lower bezel. This particular configuration is well suited for picking up a user's voice during a phone call.

H. Image Sensor

A hand-held electronic device may also include an image sensor and lens related components so that the hand-held device can operate like a camera. The image sensor may, for example, include a charge coupled device (CCD) camera.

I. Input Device Functionality

1. Touch Gestures

A hand-held electronic device may be designed to recognize touch gestures applied to a touch screen and/or touch sensitive surface of the housing and thereby control aspects of the hand-held electronic device. Gestures are a stylized interaction with an input device that is mapped to one or more specific computing operations. The gestures may be made through various hand and finger motions. Gestures generally comprise a contact chord e.g., one or more fingers, and a motion associated with the chord. Alternatively or additionally, the gestures may be made with a stylus. In all of these cases, the input device i.e., touch screen and/or touch sensitive surface) receive the gestures and a controller of the hand-held electronic device executes instructions to carry out operations associated with the gestures. The hand-held electronic device may include a touch gesture operational program, which may be part of the operating system or a separate application. The gesture operation program generally includes a set of instructions that recognizes the occurrence of gestures and informs one or more software agents of the gestures and/or what action(s) to take in response to the gestures. For example, gestures that can be used are disclosed in greater detail in U.S. patent application Ser. No. 10/903,964, titled "Gestures for Touch Sensitive Input Devices," filed on Jul. 30, 2004, and U.S. patent application Ser. No. 11/038,590, titled "Mode-Based Graphical User Interfaces for Touch Sensitive Input Devices," filed on Jan. 18, 2005.

2. 3-D Spatial Gestures

In accordance with one embodiment, the hand-held electronic device may be designed to recognize 3-D spatial gestures measured by an accelerometer and to control aspects of the hand-held electronic device based on the 3-D spatial gestures. Spatial gestures are stylized motions of the device itself that are mapped to one or more specific computing operations. The 3-D spatial gestures may be made through various hand and arm motions, such as for example shaking, waving and the like. The accelerometer measures the motion related to the 3-D spatial gestures and a controller recognizes the motion as a 3-D spatial gesture and thereafter executes instructions to carry out operations associated with the 3-D spatial gestures. The hand-held electronic device may include a 3-D spatial gesture operational program, which may be part of the operating system or a separate application. The gesture operation program generally includes a set of instructions that recognizes the occurrence of gestures and informs one or more software agents of the gestures and/or what action(s) to take in response to the gestures.

One exemplary 3-D gesture is shaking the device. Shaking can cause the hand-held device causes the device to shift between modes or states. Alternatively, shaking the hand-held device can cause a selection event to occur. For example, in the case of a media player, shaking the device may cause the device to randomly select a picture or song in group of pictures or songs. Alternatively, shaking the device may cause the device to select the next picture or song in a sequence of songs.

Other gestures may include translating or rotating the device. Translating the hand-held device (while it is face up) from side to side may be used to initiate panning or scrolling in the device, or moving the device up and down (while it is face up) may be used to initiate zooming. Rotating the device may be used to cause the device to change modes or states. In some cases, for example, the orientation of the device may correspond to a particular mode. For example, a first mode may be associated with 0 degrees, a second mode may be associated with 90 degrees, a third mode may be associated with 180 degrees and a fourth mode may be associated with 270 degrees. In all these cases, the device can be configured to keep the displayed portion upright as the device is turned. That is, it maintains an upright image no matter what orientation the device is in.

The 3-D spatial gestures may even be based on more complex motions such as sign language, writing motions, etc.

3. Perform Action Based on Multiple Inputs

Because the device may have multiple input modes, the hand-held device may be configured to receive simultaneous inputs from different inputs devices, and perform actions based on the multiple simultaneous inputs. The inputs that may be combined to produce new commands may be selected from voice, 2-D touch gestures, 3-D spatial gestures, actuators, etc. For example, this feature may be helpful when making calls via voice selection. A caller may verbalize "TOM," which causes the device to dial "TOM" phone number. If "TOM" has multiple phone numbers, a user may combine the verbal command "TOM" with a 3-D spatial gesture such as shaking to select Tom's second phone number. Various other possibilities will be appreciated by those skilled in the art.

4. Differentiating Between Light and Hard Touches

As noted above, force sensing in conjunction with touch sensing facilitates two distinct types of interactions, light touches and hard touches. Light touches may be used to perform passive actions such as navigating through content and content manipulation generally without causing a major event to occur. Examples of passive events include moving a cursor, scrolling, panning, etc. Hard touch interactions may be used to select on screen buttons or initiate commands (e.g., causes a significant change to occur).

Figure 25:
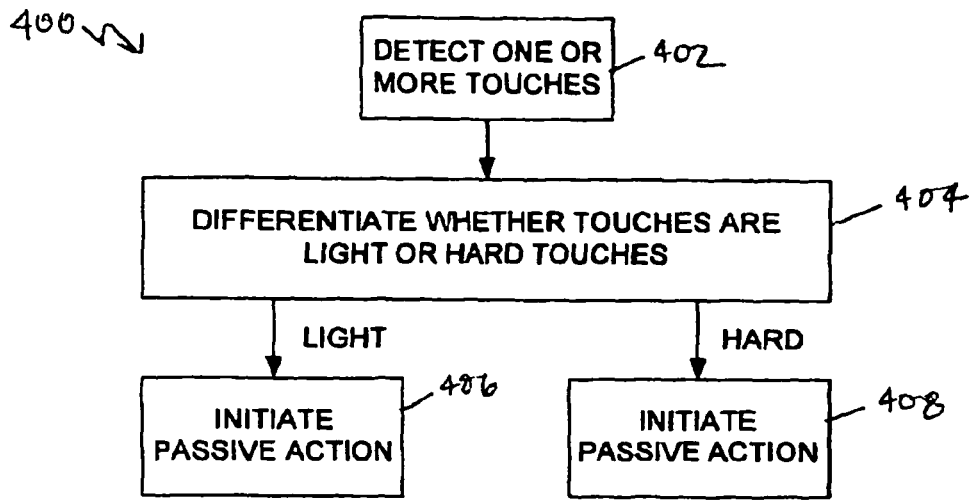
FIG. 25 is a block diagram of a touch sensing method.

FIG. 25 is a diagram of a touch method 400 for implementing this technique. The method 400 begins at block 402 where one or more touches are detected. The touches include not only x any y components but also z components. The x and y components may be supplied by a touch sensing device such as touch screen, touch pad, or touch housing. The z component may be provided by force sensors or display actuators located behind the touch surface of the touch sensing device.

Following block 402, the method proceeds to block 404 where a determination is made as to whether the touch is a light or hard touch. The determination is generally based on the force or pressure of the touch (z component). For example, if the force of the touch is smaller than a predetermined threshold then the touch is considered a light touch and if the force of the touch is larger than the predetermined threshold then the touch is considered a hard touch. If it is determined that the touch is a light touch, the method proceeds to block 406 where a passive action associated with the touch is initiated. If it is determined that the touch is hard touch, an active action associated with the touch is performed (block 408).

The touch method may additionally include a block where the one or more touches are classified as a primary touch or a secondary touch. Primary touches are touches that are intended to cause an action while secondary touches are touches that are not intended to cause an action. Gestures are examples of primary touches while a thumb positioned over the touch area to hold the device is an example of a secondary touch. Once the touches are classified as primary or secondary, the secondary touches are filtered out, and the determination of whether a touch is a light or hard touch is made with the primary touches.

5. Example of a New Touch Vocabulary

The z pressure exerted on a touch sensing device can be combined with the x and y locations of the touch to form a new touch vocabulary. As should be appreciated, up to this point touch vocabularies have only included x and y locations, not z pressure. A proposed touch vocabulary includes variety of variables including the UI mode, the force of the touch (e.g., light or hard), the number of fingers used, whether or not there is any movement during the touch, the duration of the touch, and the touch location, all or some of which can be combined to form a variety of behaviors and user feedback.

The UI mode is generally related to the mode or state of the device. Each device includes a variety of states and each state may require a different UI mode. A media player (a mode) may, for example, include a set of hierarchal layers (states) with each layer requiring a different UI.

As noted above, the force of the touch may, for example, be described as light or hard. A light touch may occur when a user lightly touches the surface of the touch surface, i.e., the finger hovers on top of the surface and is primarily moved in the x and y directions. A hard touch may occur when a user presses on the touch surface with a certain amount of force, i.e., the finger is primarily moved in the z direction against the touch surface.

Motion during the touch is used to describe whether the finger has remained stationary during a touch event or has substantially moved in the X-Y plane (e.g., translation, rotation, etc.). The motion may be described as none at all or a swipe or twist in some particular direction. By way of example, the swipe may be up, down, right, left, or some combination thereof, and the twist may be clockwise or counterclockwise.

Duration is defined as the amount of time the finger stays at any one point. Duration may be variable or it may include states such as short and long. The touch location may be a random point or a specific location such as an onscreen button.

Figure 26:
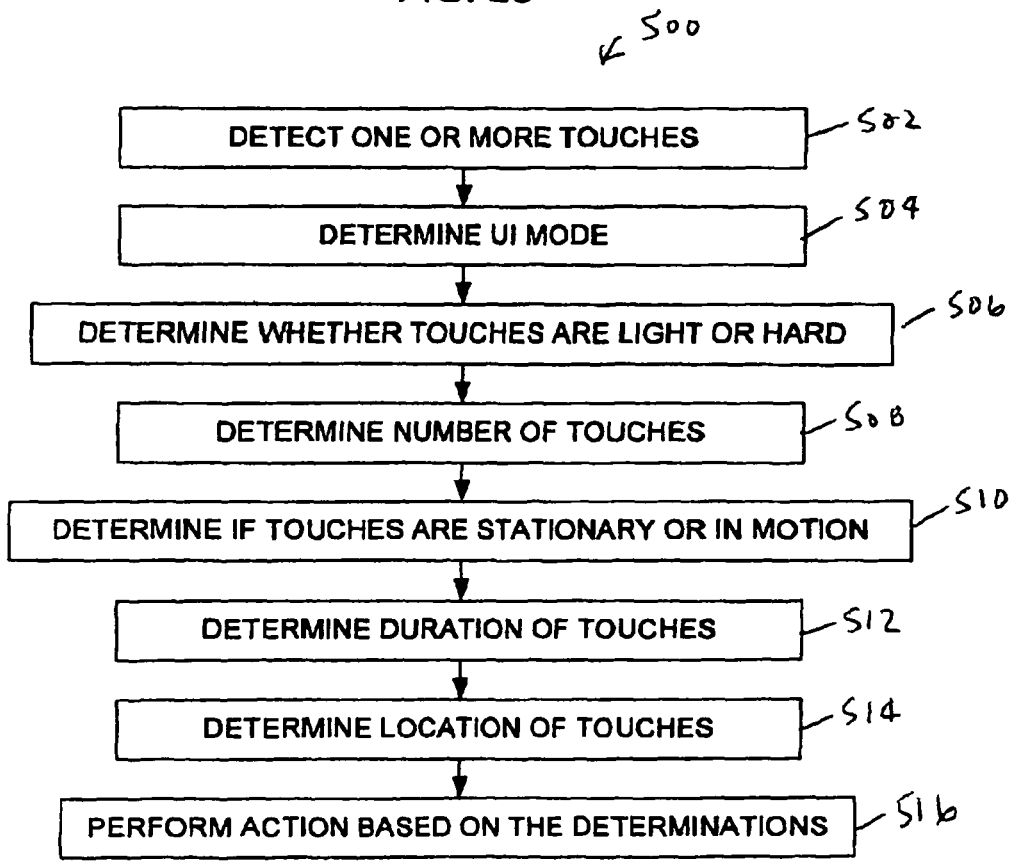
FIG. 26 is a block diagram of touch sensing method.

FIG. 26 is an additional touch method 500 implementing this technique. The method begins at block 502 when one or more touches are detected. Thereafter, in block 504, the UI mode is determined. In block 506, a determination is made as to whether the touches are light touches or hard touches. Alternatively, blocks 502 and 504 could be reversed, effectively resulting in an instance of the touch method for each mode. In block 508, the number of distinct touches (e.g., fingers) is determined. In block 510, a determination is made as to whether the touches are stationary or in motion. In block 512, the duration of the touches is determined. In block 514, the locations of the touches are determined. Following blocks 502-514, the method proceeds to block 516 where an action is performed based on the UI mode, the pressure of the touch, the number of touches, whether or not the touch is moving, the duration of the touch, and the touch location. The actions may be passive or active depending on the values of each characteristic.

One example of a touch vocabulary associated with a music player is shown in FIGS. 27A-E.

V. Output Devices

A. Display

The principle output of a hand-held electronic device is typically a display. The display provides visual information in the form of text, characters or graphics. The display is usually a flat panel device although other types of displays may be used. The display may be a liquid crystal display (LCD) such as a character LCD that is capable of presenting text and symbols or a graphical LCD that is capable of presenting images, video, and graphical user interfaces (GUI). Alternatively, the display may correspond to a display based on organic light emitting diodes (OLED), or a display that is based on electronic inks.

Preferably, the display may be configured to substantially fill the front surface of the housing. The display may extend from one edge of the housing to the opposite edge of the housing, the housing may include a small bezel that surrounds the edges of the display. In either case, the display makes up a substantial portion of the front surface of the hand-held electronic device, thereby eliminating any space for buttons or switches associated with a conventional user interface.

As mentioned above, besides outputting visual information, the display may also act like an input device. For example, a touch screen may be positioned over the display, and/or sensors may be disposed underneath the display to sense when the device is pressed or otherwise moved. In most cases, the small form factor of hand-held devices requires central placement of the input interfaces to permit operation while being carried around and used by the hand. The display region provides a central location, which can be accessed by both the left and right hands.

The display region may be formed by more than one display. For example, the display region may be formed by a pair of displays that are side by side or one on top of the other. A first display may be used to present the standard screen and a second display may be used to present the control screen as described above with reference to FIGS. 5-8. Furthermore, a first display may be a conventional display while the second display may be a display actuator. Moreover, a first display may comprise of a first type and a second display may be of a second type. For example, the first display may be an LCD while the second display may be a display based on electronic inks.

The decision to use different types may be based on the fact that one of the displays may be dedicated to a standard viewing area while another may be dedicated to a control area. Because these two areas require different resolutions, a higher resolution screen may be used in the standard area while a lower resolution screen may be used in the control area. Alternatively or additionally, one of the displays may be selected to reduce battery consumption especially in the control area where lower resolution is acceptable. In some cases, although two different displays are used, the images displayed thereon may be combined to form a single unified image.

B. Speaker

And-held device may also include a speaker. Speakers are components that accept electronic signals representing audio information from an amplifier and converts them into sound waves. The speakers may be used to listen to music in conjunction with a music player functionality or to listen to an incoming call in conjunction with a cell phone functionality. The speaker may be placed on the top surface or possible on the front top bezel of the hand-held device. This arrangement works particularly well when the device is used as a cell phone.

Indicator (LED)

A hand-held device may also include one or more indicators that provide user feedback or indicate events associated with the device. The events may relate to signals, conditions or status of the device. For example, the indicators provide status of battery life or alert a user when there is an incoming call. The indicators, which include light sources such as light emitting diodes (LED), are typically illuminated when an event occurs, and not illuminated when the event is stopped. Furthermore, the indicator may turn on and off (blink) or cycle with increasing or decreasing intensity, and in some cases may even change colors in order to provide more detailed information about the event that is being monitored.

The indicators may be conventional indicators that typically include a small clear plastic insert, which is located in front of the LED, and which is inserted within an opening in the housing thus causing it to exist at the surface of the housing. The LED itself may also be placed in the opening in the housing rather than using an insert. Alternatively, the indicator can be configured not to break the surface of the housing. In this configuration, the light source is disposed entirely inside the housing, and is configured to illuminate a portion of the housing thereby causing the housing to change its appearance, i.e., change its color.

D. Audio/Tactile Feedback Devices

The hand-held device may include speakers or buzzers to give audio feedback to the user. These may work similarly to the indicators described above, or they may be used to enhance the feel of actuating a GUI element such as a soft button or scroll wheel. For example, the speaker may be configured to output a "clicking" noise when a user presses on a virtual button, or rotates a virtual scroll wheel. This particular feature enhances the user experience and makes the virtual UI feel more like a physical UI.

The hand-held device may also include a haptics mechanism. Haptics is the science of applying tactile sensation and control to interaction with computer applications. Haptics essentially allows a user to feel information, i.e., signals are sent to the hand. The haptics mechanisms may be widely varied. They may include motors, vibrators, electromagnets, etc., all of which are capable of providing force feedback in the form of vibration or shaking. The haptics mechanisms may work similarly to the indicators described above (alert), or they may be used to enhance the feel of actuating a GUI element such as a soft button or scroll wheel. For example, the haptics mechanism may be configured to vibrate when a user presses on a virtual button, or rotates a virtual scroll wheel. This particular feature enhances the users experience and makes the virtual UI feel more like a physical UI. Haptics may also be used simultaneously with onscreen actions. For example, during movies or game playing, the haptics mechanism can simulate the action being displayed. For example, the haptics mechanism may provide force feedback in the form of vibration when a car explodes during a movie or game.

In cases where haptics is used to enhance the feel of actuating a GUI element, such as a soft button or scroll wheel, the haptics mechanism may be located in the region of the display and further underneath the display so as to provide force feedback directly underneath the user action. In fact, multiple haptics mechanisms may be used regionally across the display to further enhance the feel. It is generally believed that the closer the vibration is to the user action, the greater the haptics effect. In one implementation, the haptics mechanisms are spaced out in an array underneath the display. That is, they are spatially separated and placed at different locations. By way of example, they may be positioned in a 2×2, 2×4, 4×4, 4×8, 8×8 array and so on underneath the display.

Audio and/or tactile feedback may be used to alert a user that a user input has been made. For example, in response to touching a virtual button on the GUI, the haptics may provide force feedback in the form of vibration and the speaker may provide audio feedback in the form of a click. The tactile audio feedback can be used in conjunction with an input event including touch events, motion events, squeeze events. The feedback may provide information so that the user knows that they actually implemented an input (simulates the audio and tactile feel of a button or switch). In one implementation, the feedback is tied to the level of force being applied to the force sensing devices. For example, when a certain force threshold is reached, the audio feedback device may create a "click" on the press and a "clock" on the release. The force threshold used may be similar to the threshold used to determine whether a touch is a light or hard touch. The "click" and "clock" may be used to simulate a button click when a hard touch is made.

VI. Communication Devices

A. Wired

The hand-held device may also include one or more connectors for receiving and transmitting data to and from the device. By way of example, the device may include one or more audio jacks, video jacks, data ports, docking ports, etc. The hand-held device may also include one or more connectors for receiving and transmitting power to and from the hand-held device.

The hand-held device may include a headphone/microphone jack and a data port. The jack is capable of receiving a speaker and/or microphone plug so that audio may be input to and output from the device. The data port is capable of receiving a data plug/cable assembly configured for transmitting and receiving data to and from a host device, such as a general purpose computer (e.g., desktop computer, portable computer). For example, the data port may be used to upload or download data to and from the hand-held device. Such data may include songs and play lists, audio books, e-books, photos, address books, documents, appointments, etc. into the hand-held device. The data port may be a PS/2 port, serial port, parallel port, network interface port, USB port, Firewire port etc. The hand-held device may also include a power port that receives a power plug/cable assembly configured for delivering powering to the hand-held device. In some cases, the data port may serve as both a data and power port by employing either standard or proprietary connectors.

B. Wireless

To send and receive data wirelessly, the device generally requires a transmitter, a receiver (or a transceiver) and some sort of antenna. The wireless communication link may correspond to Bluetooth, WiFi (802.11), IR (infrared), etc. The antenna may be fully contained within the device or they may extend outside the device. The antenna may take a variety of forms depending on the frequency to be used, etc. For example be a rugged rubber duck that consists of a coiled up element encased in rubber. Alternatively, the antenna may be printed on a circuit board within the device.

The hand-held device may also include a radio transceiver for communications via a cellular network or a GPS receiver.

C. Change UI Based on Received Communication Signals

A hand-held electronic device may be configured to actively look for signals in the surrounding environment, and change its mode based on the signal. That is, the device tries to match the mode with the signal. If the device receives a phone signal over the cellular network, the device may turn into a phone, i.e., the phone mode is activated or brought forward relative to the other modes. If a device receives an email, the device may turn into an email terminal. As another example, when a user walks into a home theater room, the device may sense signals from the media control unit and turn itself into a remote control including functionality to control the various devices of the home theater (TV, amp, DVD, lighting). In other cases, the device may sense signals, which are being broadcast in physical stores, and turn itself into a device that is well suited for that store. For example, in a bank, the device may change into a calculator or bring a money program into view, or in a grocery store, the device may turn into a money payment device or bring a grocery list into view.

VII. Other Components of Hand-Held Device

The hand held device may additionally include one or more of the following hardware components: a controller (e.g., microprocessor, DSP, A/D, D/A, converters, codes), memory (e.g., RAM, ROM, solid state (flash), hard disk (micro-drive)), storage (SD card slots, mini-DVD), battery (e.g., lithium ion), etc.

VIII. Overall Block Diagram

Figure 28:
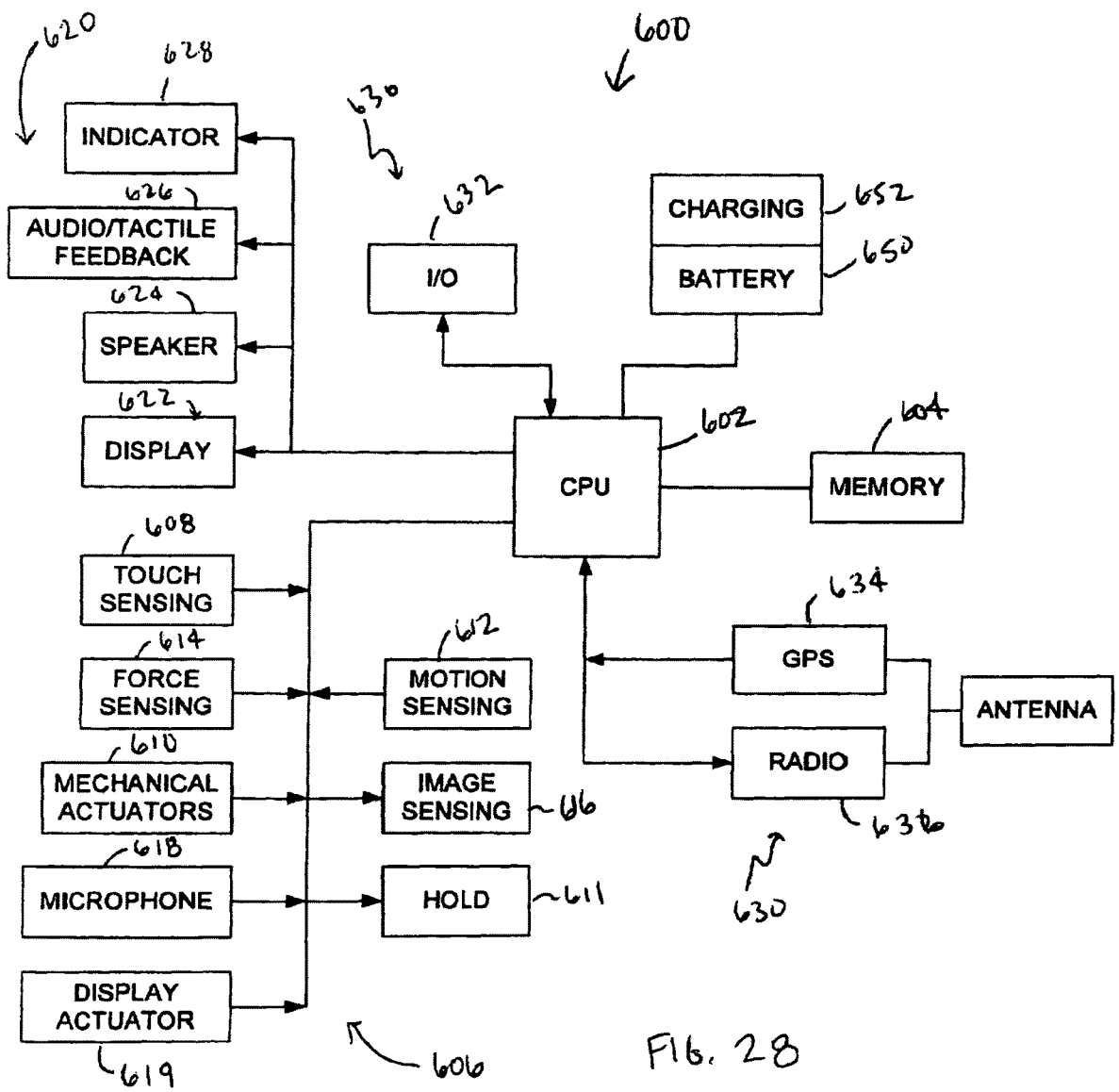
FIG. 28 is a block diagram of an exemplary multi-functional hand-held device.

FIG. 28 is a block diagram of an exemplary hand-held device 600. The hand-held device 600 typically includes a controller 602 (e.g., CPU) configured to execute instructions and to carry out operations associated with the hand-held device. For example, using instructions retrieved for example from memory, the controller 602 may control the reception and manipulation of input and output data between components of the hand-held device 600. The controller 602 can be implemented on a single chip, multiple chips or multiple electrical components. For example, various architectures can be used for the controller 602, including dedicated or embedded processor, single purpose processor, controller, ASIC, etc. By way of example, the controller may include microprocessors, DSP, A/D converters, D/A converters, compression, decompression, etc.

In most cases, the controller 602 together with an operating system operates to execute computer code and produce and use data. The operating system may correspond to well known operating systems such as OS/2, DOS, Unix, Linux, and Palm OS, or alternatively to special purpose operating system, such as those used for limited purpose appliance-type devices. The operating system, other computer code and data may reside within a memory block 604 that is operatively coupled to the controller 602. Memory block 604 generally provides a place to store computer code and data that are used by the hand-held device. By way of example, the memory block 604 may include read-only memory (ROM), random-access memory (RAM), hard disk drive (e.g., a micro drive), flash memory, etc. In conjunction with the memory block 604, the hand-held device may include a removable storage device such as an optical disc player that receives and plays DVDs, or card slots for receiving mediums such as memory cards (or memory sticks). Because the form factor of the hand-held device is small, the optical drive may only be configured for mini DVDs.

The hand-held device 600 also includes various input devices 606 that are operatively coupled to the controller 602. The input devices 606 are configured to transfer data from the outside world into the hand-held device 600. As shown, the input devices 606 may correspond to both data entry mechanisms and data capture mechanisms. In particular, the input devices 606 may include touch sensing devices 608 such as touch screens, touch pads and touch sensing surfaces, mechanical actuators 610 such as button or wheels or hold switches (611), motion sensing devices 612 such as accelerometers, force sensing devices 614 such as force sensitive displays and housings, image sensors 616, and microphones 618. The input devices 606 may also include a clickable display actuator 619.

The hand-held device 600 also includes various output devices 620 that are operatively coupled to the controller 602. The output devices 620 are configured to transfer data from the hand-held device 600 to the outside world. The output devices 620 may include a display 622 such as an LCD, speakers or jacks 624, audio/tactile feedback devices 626, light indicators 628, and the like The hand-held device 600 also includes various communication devices 630 that are operatively coupled to the controller 602. The communication devices 630 may, for example, include both wired and wireless connectivity selected from I/O ports 632 such as IR, USB, or Firewire ports, GPS receiver 634, and a radio receiver 636.

The hand-held device 600 also includes a battery 650 and possibly a charging system 652. The battery may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A hand-held electronic device, comprising:
   a force sensitive multi-touch input surface including a plurality of capacitive touch sensors capable of detecting a concurrent plurality of touches and generating a plurality of concurrent touch inputs, and one or more force sensors; and
   a processing unit operatively connected to said force sensitive multi-touch input surface, said processing unit capable of
      receiving one or more touch inputs and one or more force inputs from the plurality of capacitive touch sensors and the one or more force sensors resulting from one or more touches,
      discriminating a location of the one or more touches from the one or more touch inputs,
      determining that the one or more touches represent either a first force level touch or a second force level touch based on data from the one or more force sensors, and
      initiating a first action including one of moving a cursor, scrolling, panning and zooming based on a first force level touch determination and initiating a second action based on a second force level touch determination;
   wherein said hand-held electronic device is operable to receive simultaneous inputs from different input devices and perform actions based on the simultaneous inputs.

2. A hand-held electronic device as recited in claim 1, wherein said hand-held electronic device includes two or more of the following device functionalities: PDA, mobile phone, music player, camera, video player, game player, handtop, Internet terminal, GPS receiver, and remote control.

3. A hand-held electronic device as recited in claim 1, further comprising a display device operatively coupled to the processing unit and configured to present a user interface, the display device integral with the force sensitive multi-touch input surface to form a multi-point touch screen, wherein said hand-held electronic device is capable of reconfiguring or adapting the user interface based on the state or mode of said hand-held electronic device.

4. A hand-held electronic device as recited in claim 3, wherein said display device is a full screen display.

5. A hand-held electronic device as recited in claim 1, wherein said force sensitive multi-touch input surface serves as a primary input means necessary to interact with said hand-held electronic device.

6. A hand-held electronic device as recited in claim 5, wherein said hand-held electronic device includes cross-functional physical buttons.

7. A hand-held electronic device as recited in claim 1, wherein said hand-held electronic device is operable to recognize touch gestures applied to said force sensitive multi-touch input surface wherein the touch gestures are used to control aspects of said hand-held electronic device.

8. A hand-held electronic device as recited in claim 1, wherein signals from various input devices of said hand-held electronic device have different meanings or outputs based on a mode of said hand-held electronic device.

9. A hand-held electronic device as recited in claim 3, wherein said user interface comprises a standard region and a control region, the standard region being used to display data, and the control region including one or more virtual controls for user interaction.

10. A hand-held electronic device as recited in claim 9, wherein at least one of the standard region and the control region are user configurable.

11. A hand-held electronic device as recited in claim 1, wherein said hand-held electronic device provides audio or tactile feedback to a user based on user inputs made with respect to said hand-held electronic device.

12. A hand-held electronic device as recited in claim 1, wherein said hand-held electronic device is configurable to actively look for signals in a surrounding environment, and change user interface or mode of operation based on the signals.

13. A hand-held computing device, comprising:
a housing;
a display arrangement positioned within said housing, said display arrangement including a display, one or more force sensors configured to measure a force applied to some portion of said display arrangement, and a plurality of capacitive touch sensors capable of detecting a concurrent plurality of touches and generating a plurality of concurrent touch inputs, the plurality of capacitive touch sensors to form a multi-point touch screen with the display; and
a processing unit configured to
receive one or more touch inputs and one or more force inputs resulting from one or more touches,
determine a location of the one or more touch inputs,
determine that the one or more touches represent either a first force level touch or a second force level touch based on data from the one or more force sensors, and
initiate a first action including one of moving a cursor, scrolling, panning and zooming based on a first force level touch determination and initiating a second action based on a second force level touch determination;
wherein said hand-held computing device is operable to receive simultaneous inputs from different input devices and perform actions based on the simultaneous inputs.

14. A hand-held electronic device, comprising:
a multi-point touch screen including a plurality of capacitive touch sensors capable of detecting a concurrent plurality of touches and generating a plurality of concurrent touch inputs;
one or more force sensors arranged with the multi-point touch screen; and
a processing unit operatively connected to said multi-point touch screen and the one or more force sensors, said processing unit configured for
receiving one or more touch inputs and one or more force signals from said touch screen and the one or more force sensors resulting from one or more touches,
determining a location of the one or more touch inputs,
determining that the one or more touches represent either a first force level touch or a second force level touch based on data from the one or more force sensors, and
initiating a first action including one of moving a cursor, scrolling, panning and zooming based on a first force level touch determination and initiating a second action based on a second force level touch determination;
wherein said multi-point touch screen serves as the primary input means necessary to interact with said hand-held electronic device; and
wherein said hand-held electronic device is operable to receive simultaneous inputs from different input devices and perform actions based on the simultaneous inputs.

15. A hand-held electronic device as recited in claim 14, wherein said hand-held electronic device operates as one or more of a mobile phone, a PDA, a media player, a camera, a same player, a handtop, an Internet terminal, a GPS receiver, or a remote controller.

16. The hand-held electronic device as recited in claim 3, wherein said one or more force sensors are attached to the back of said display device or to a structural platform located within a housing of said hand-held electronic device.

17. The hand-held electronic device as recited in claim 3, wherein when a force is applied to said display device, the force is transmitted through said display device to said one or more force sensors located underneath said display device.

18. The hand-held electronic device as recited in claim 1, wherein the force sensitive multi-touch input surface includes one or more force sensitive strain gauges.

19. The hand-held electronic device as recited in claim 18, wherein the one or more force sensitive strain gauges are attached to a structural platform within the display device.

20. The hand-held electronic device as recited in claim 19, further comprising a resilient structure between the display device and the structural platform.

21. The hand-held electronic device as recited in claim 1, wherein the force sensitive multi-touch input surface provides position sensing in X and Y directions and provides force sensing in the Z direction.

22. The hand-held electronic device as recited in claim 1, the force sensitive multi-touch input surface configured for displacing inwardly in a Z direction in response to pressure received on the display.

23. A method comprising:
    detecting a plurality of concurrent touch inputs on a touch surface from a concurrent plurality of touches using a plurality of capacitive touch sensors;
    detecting one or more force inputs at one or more locations arranged about the touch surface;
    discriminating a location of the concurrent plurality of touches from the plurality of concurrent touch inputs;
    determining that the concurrent plurality of touches represents either a first force level touch or a second force level touch based on the one or more force inputs;
    initiating a first action including one of moving a cursor, scrolling, panning and zooming based on a first force level touch determination and initiating a second action based on a second force level touch determination; and
    receiving simultaneous inputs from different input devices and performing actions based on the simultaneous inputs.

* * * * *

UNITED STATES PATENT AND TRADEMARK OFFICE
CERTIFICATE OF CORRECTION

| | |
|---|---|
| PATENT NO. | : 11,275,405 B2 |
| APPLICATION NO. | : 11/367749 |
| DATED | : March 15, 2022 |
| INVENTOR(S) | : Steven P. Hotelling |

It is certified that error appears in the above-identified patent and that said Letters Patent is hereby corrected as shown below:

In the Specification

In Column 1, Line 14, delete "title" and insert --titled--.

In Column 1, Line 26, delete "No." and insert --No. 11/038,590, titled "Mode-Based Graphical User Interfaces for Touch Sensitive Input Devices," filed on Jan. 18, 2005; and (8) U.S. patent application Ser. No.--.

Signed and Sealed this
Thirty-first Day of May, 2022

Katherine Kelly Vidal
*Director of the United States Patent and Trademark Office*